(12) United States Patent
Liu et al.

(10) Patent No.: US 7,211,226 B2
(45) Date of Patent: *May 1, 2007

(54) CATALYST AND FILTER COMBINATION

(75) Inventors: Z. Gerald Liu, Madison, WI (US); Robert K. Miller, Indianapolis, IN (US); Barry M. Verdegan, Stoughton, WI (US); William C. Haberkamp, Cookeville, TN (US)

(73) Assignee: Fleetgaurd, Inc., Nashville, TN (US)

( * ) Notice: Subject to any disclaimer, the term of this patent is extended or adjusted under 35 U.S.C. 154(b) by 636 days.

This patent is subject to a terminal disclaimer.

(21) Appl. No.: 10/075,035

(22) Filed: Feb. 12, 2002

(65) Prior Publication Data

US 2003/0190269 A1    Oct. 9, 2003

Related U.S. Application Data

(63) Continuation-in-part of application No. 09/851,300, filed on May 8, 2001, now Pat. No. 6,776,814, and a continuation-in-part of application No. 09/522,152, filed on Mar. 9, 2000, now Pat. No. 6,669,913.

(51) Int. Cl.
    *B01D 50/00*    (2006.01)
(52) U.S. Cl. .................. 422/168; 422/177; 422/180
(58) Field of Classification Search ................ 422/171, 422/177, 180; 55/385.3, 483–484, 499, 521, 55/523–525, DIG. 10, DIG. 30, DIG. 28; 60/311
    See application file for complete search history.

(56) References Cited

U.S. PATENT DOCUMENTS

| | | |
|---|---|---|
| 1,893,372 A | 1/1933 | Krzanowsky |
| 1,924,472 A | 8/1933 | Thomson |
| 2,410,371 A | 10/1946 | Vokes |
| 2,553,054 A | 5/1951 | Lincoln et al. |
| 3,022,861 A | 2/1962 | Harms |
| 3,025,964 A | 3/1962 | Summers et al. |
| 3,441,381 A | 4/1969 | Keith et al. |
| 3,655,060 A | 4/1972 | Hagdahl |
| 3,692,184 A | 9/1972 | Miller, Jr. et al. |
| 3,708,957 A | 1/1973 | Labadie |
| 3,799,354 A | 3/1974 | Buckman et al. |
| 3,844,749 A | 10/1974 | Carter, Sr. |
| 4,017,347 A | 4/1977 | Cleveland |
| 4,056,375 A | 11/1977 | Ringel et al. |
| 4,130,487 A | 12/1978 | Hunter et al. |
| 4,157,902 A | 6/1979 | Tokar |
| 4,410,427 A | 10/1983 | Wydevan |
| 4,419,108 A | 12/1983 | Frost et al. |

(Continued)

FOREIGN PATENT DOCUMENTS

GB    563768    1/1943

(Continued)

*Primary Examiner*—Glenn Caldarola
*Assistant Examiner*—Tom P. Duong
(74) *Attorney, Agent, or Firm*—Andrus, Sceales, Starke & Sawall, LLP; J. Bruce Schelkopf

(57) ABSTRACT

An exhaust aftertreatment combined filter and catalytic converter has a plurality of flow channels each having both: a) a flow-through channel catalytically reacting with the exhaust; and b) a wall-flow channel trapping particulate such as soot. A filter is also provided.

4 Claims, 11 Drawing Sheets

U.S. PATENT DOCUMENTS

| | | | |
|---|---|---|---|
| 4,430,223 A | 2/1984 | Miyakawa et al. |
| 4,441,899 A | 4/1984 | Takagai et al. |
| 4,455,823 A | 6/1984 | Bly et al. |
| 4,498,989 A | 2/1985 | Miyakawa et al. |
| 4,542,286 A | 9/1985 | Kusuda et al. |
| 4,548,626 A | 10/1985 | Ackley et al. |
| 4,589,983 A | 5/1986 | Wydevan |
| 4,619,675 A | 10/1986 | Golarz |
| 4,652,286 A | 3/1987 | Kusuda et al. |
| 4,857,089 A | 8/1989 | Kitagawa et al. |
| RE33,118 E | 11/1989 | Scheitlin et al. |
| 4,878,929 A | 11/1989 | Tofsland et al. |
| 4,902,487 A | 2/1990 | Cooper et al. |
| 4,925,561 A | 5/1990 | Ishii et al. |
| 4,960,449 A | 10/1990 | Yonushonis |
| 5,008,086 A | 4/1991 | Merry |
| 5,014,509 A | 5/1991 | Broering et al. |
| 5,015,376 A | 5/1991 | Picek |
| 5,030,263 A | 7/1991 | Kemp |
| 5,035,236 A | 7/1991 | Kanegaonkar |
| 5,052,178 A | 10/1991 | Clerc et al. |
| 5,063,736 A | 11/1991 | Hough et al. |
| 5,082,479 A | 1/1992 | Miller |
| 5,089,237 A | 2/1992 | Schuster et al. |
| 5,106,397 A | 4/1992 | Jaroszczyk et al. |
| 5,137,696 A | 8/1992 | Hitachi et al. |
| 5,174,895 A | 12/1992 | Drori |
| 5,252,299 A | 10/1993 | Retallick |
| D342,990 S | 1/1994 | Jaroszczyk |
| 5,298,046 A | 3/1994 | Peisert |
| 5,304,351 A | 4/1994 | Tanaka et al. |
| 5,322,537 A | 6/1994 | Nakamura et al. |
| 5,346,675 A | 9/1994 | Usui et al. |
| 5,380,501 A | 1/1995 | Hitachi et al. |
| 5,385,873 A | 1/1995 | MacNeill |
| 5,468,384 A | 11/1995 | Garcera et al. |
| 5,480,621 A | 1/1996 | Breuer et al. |
| 5,546,069 A | 8/1996 | Holden et al. |
| 5,549,722 A | 8/1996 | Zemaitis et al. |
| 5,562,825 A | 10/1996 | Yamada et al. |
| 5,632,792 A | 5/1997 | Haggard |
| 5,772,883 A | 6/1998 | Rothman et al. |
| 5,792,247 A | 8/1998 | Gillingham et al. |
| 5,820,646 A | 10/1998 | Gillingham et al. |
| 5,846,641 A | 12/1998 | Abeles et al. |
| 5,863,311 A | 1/1999 | Nagai et al. |
| 5,891,402 A | 4/1999 | Sassa et al. |
| 5,902,364 A | 5/1999 | Tokar et al. |
| 5,908,480 A | 6/1999 | Ban et al. |
| 5,925,561 A | 7/1999 | Posselius, Jr. et al. |
| 5,961,931 A | 10/1999 | Ban et al. |
| 6,093,378 A | 7/2000 | Deeba et al. |
| 6,238,561 B1 | 5/2001 | Liu et al. |
| 6,245,301 B1 | 6/2001 | Stroom et al. |
| 6,294,141 B1 | 9/2001 | Twigg et al. |
| 6,669,913 B1 * | 12/2003 | Haberkamp ................ 422/180 |
| 2001/0027645 A1 | 10/2001 | Itoh et al. |
| 2001/0027646 A1 | 10/2001 | Itoh et al. |
| 2001/0027647 A1 | 10/2001 | Itoh et al. |

FOREIGN PATENT DOCUMENTS

| | | |
|---|---|---|
| JP | 2-79024 | 3/1990 |
| JP | 9-125931 | 5/1997 |
| JP | 2/53442 | 2/1999 |
| JP | 2001-200715 | 7/2001 |
| WO | 88/03431 | 5/1988 |

* cited by examiner

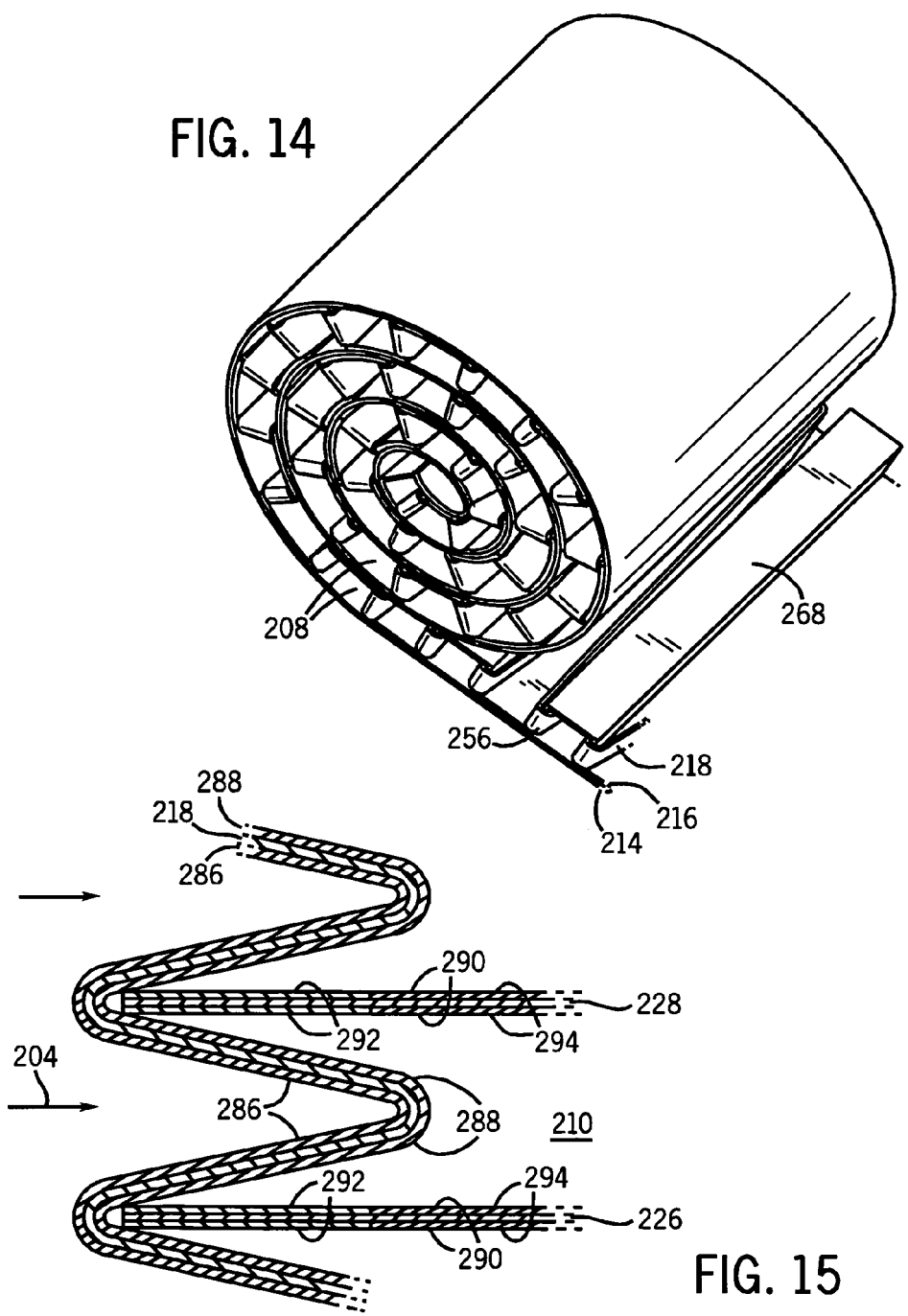

FIG. 16
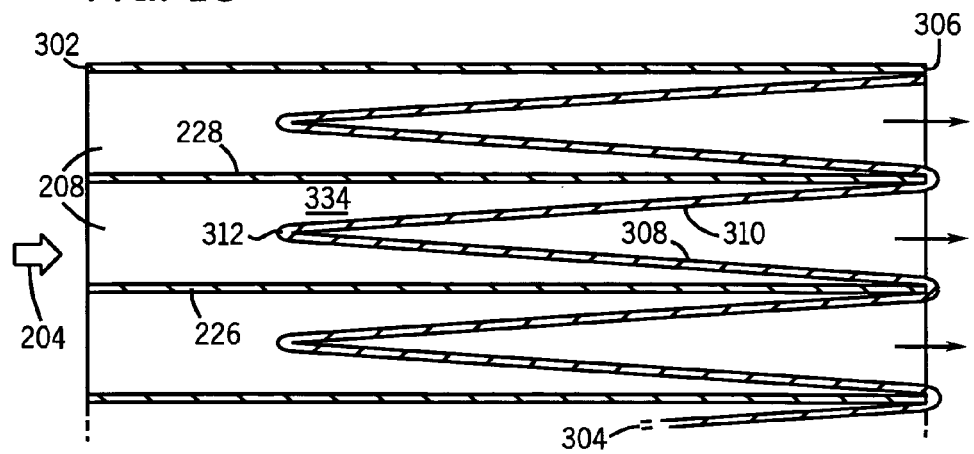
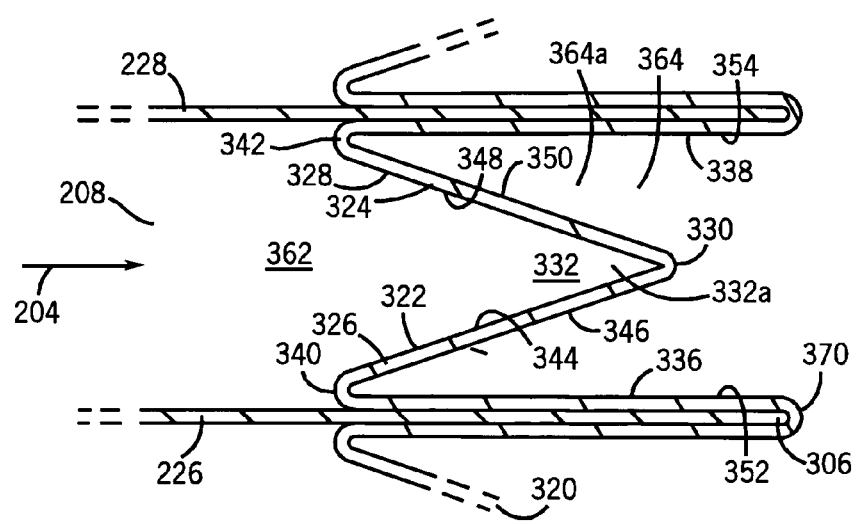
FIG. 17

CATALYST AND FILTER COMBINATION

CROSS-REFERENCE TO RELATED APPLICATIONS

This application is a continuation-in-part of U.S. patent application Ser. No. 09/522,152, filed Mar. 9, 2000, now U.S. Pat. No. 6,669,913, and a continuation-in-part of U.S. patent application Ser. No. 09/851,300, filed May 8, 2001, now U.S. Pat. No. 6,776,814, both incorporated herein by reference. The '300 application is a continuation-in-part of the '152 application.

BACKGROUND AND SUMMARY OF THE INVENTION

The invention relates to exhaust aftertreatment devices and methods, including for diesel engine exhaust, and more particularly to combined filters and catalytic converters. The invention also relates to filters.

As noted in the parent '152 application, various diesel exhaust aftertreatment systems require that the exhaust be directed through a catalytic component and also through a filter component to achieve emissions and/or particulate (e.g. soot) reduction. The parent invention of the '152 application provides a simple system combining these devices in a singular unit. In a desirable aspect, the parent invention of the '152 application further maintains exact axial alignment of catalytic and filter flow channels and simplifies packaging.

The parent invention of the '300 application arose during continuing development efforts, and provides in one desirable combination a combined catalytic converter and filter. In another desirable combination, improved filter regeneration is provided.

The present invention arose during yet further continuing development efforts. The invention provides an exhaust aftertreatment combined filter and catalytic converter which is particularly simple and effective. The invention also relates to an improved filter.

Reference is also made to commonly owned co-pending companion U.S. patent application Ser. No. 10/075,036, filed on even date herewith, now abandoned, incorporated herein by reference, which relates to exhaust aftertreatment emission control regeneration.

BRIEF DESCRIPTION OF THE DRAWINGS

Parent Applications

Present Invention

Figure 11:
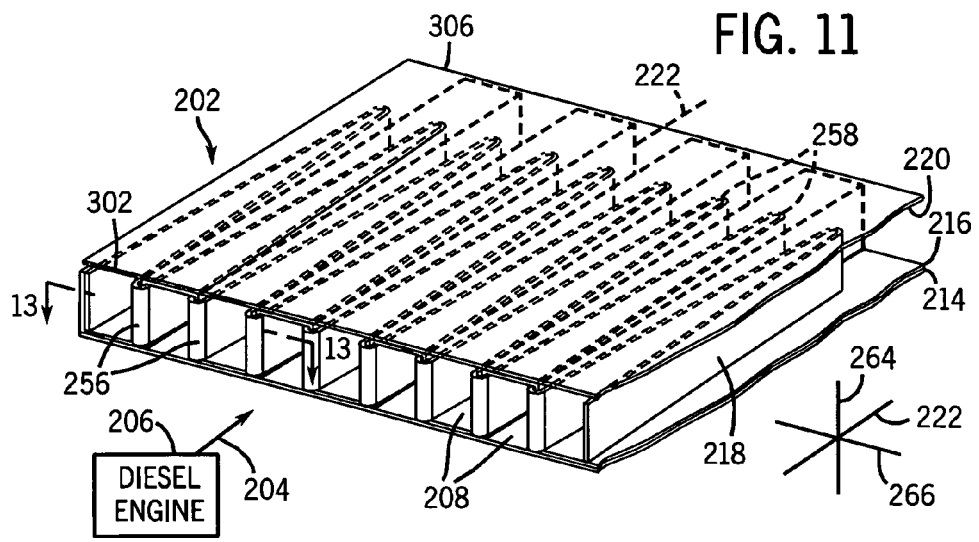

FIG. 11 is a perspective assembly view of a portion of an exhaust aftertreatment combined filter and catalytic converter in accordance with the present invention.

Figure 12:
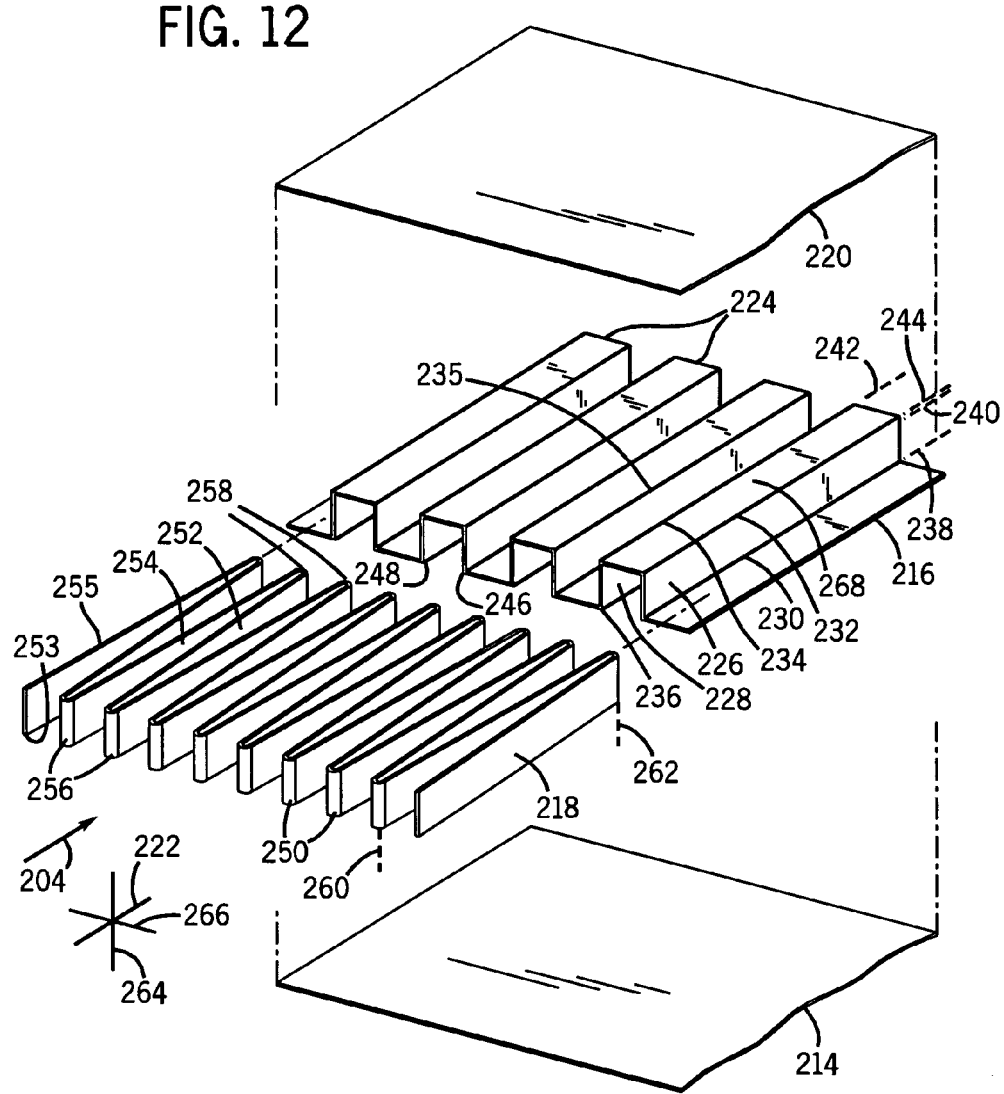

FIG. 12 is an exploded perspective view of the construction of FIG. 11.

Figure 13:
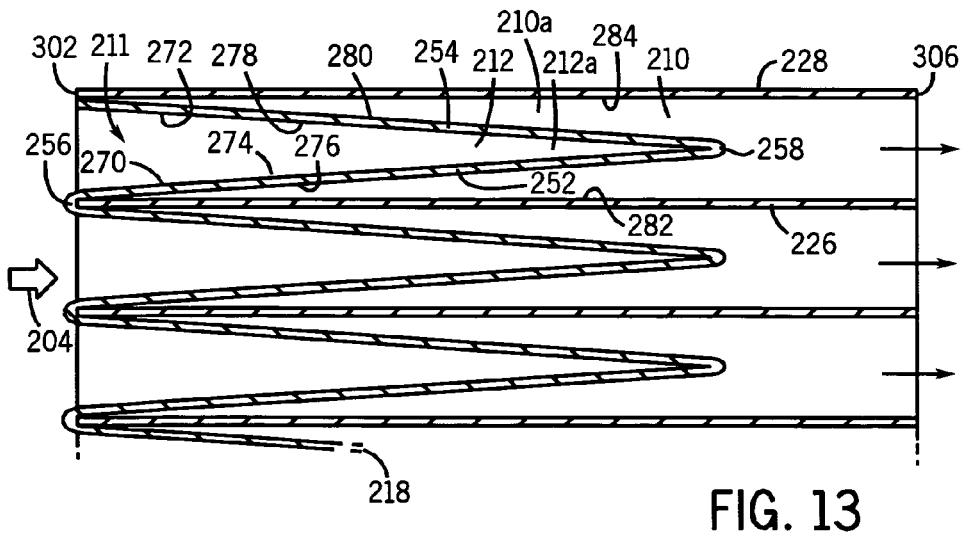

FIG. 13 is a sectional view taken along line 13—13 of FIG. 11.

FIG. 14 is a perspective view showing the construction of FIG. 11 in a spiral wound filter roll.

FIG. 15 is a view like a portion of FIG. 13 and shows a further embodiment.

FIG. 16 is a view like a portion of FIG. 13 and shows a further embodiment.

FIG. 17 is a view like a portion of FIG. 13 and shows a further embodiment.

Figure 18:
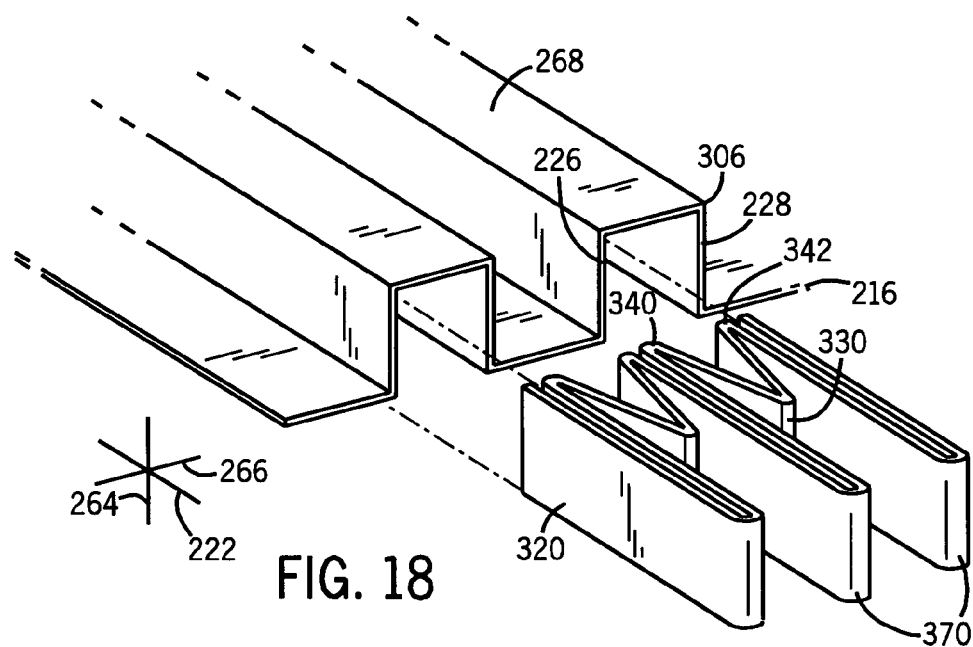

FIG. 18 is an exploded perspective view of the construction of FIG. 17.

Figure 19:
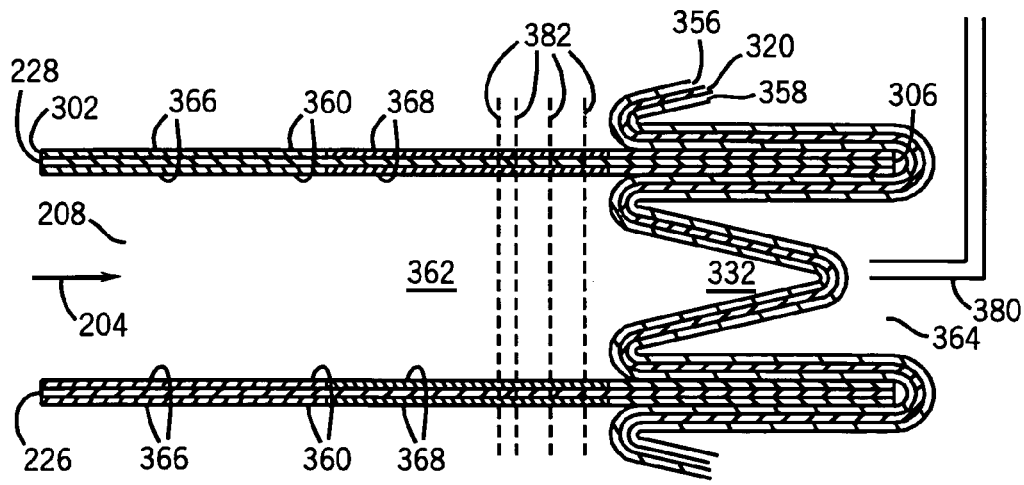

FIG. 19 is a view like FIG. 17 and shows a further embodiment.

DETAILED DESCRIPTION

Parent Applications

FIGS. 1–4 and the following description thereof are taken from parent U.S. patent application Ser. No. 09/522,152, filed Mar. 9, 2000.

Figure 1:
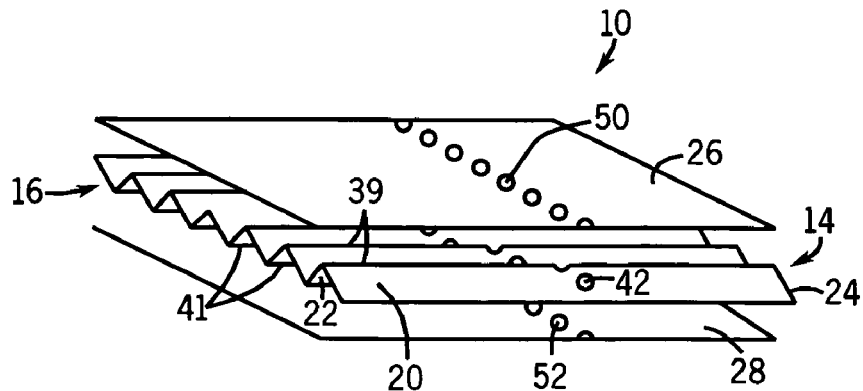
FIG. 1 is an exploded perspective view of a combination catalytic converter and filter in accordance with the parent U.S. patent application Ser. No. 09/522,152, filed Mar. 9, 2000.
Figure 2:
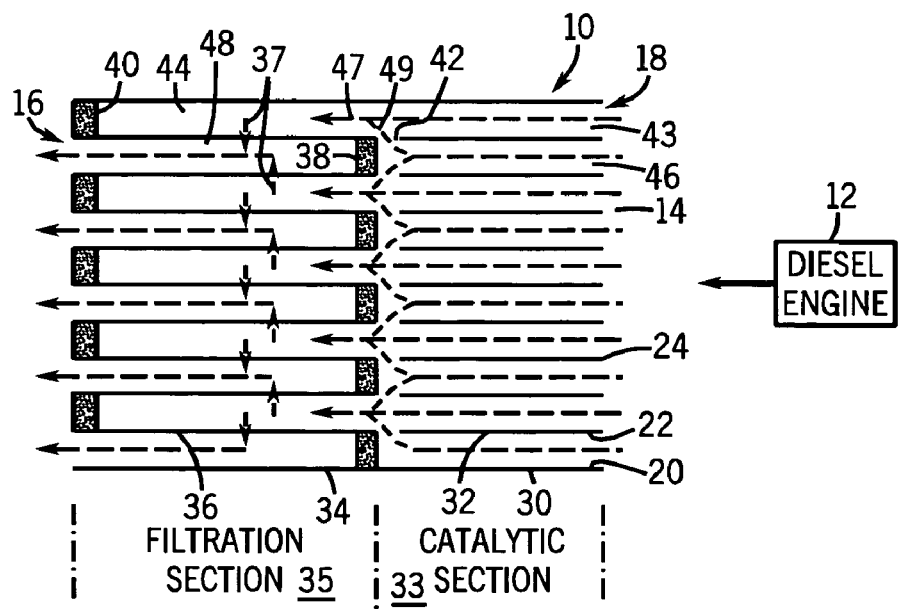
FIG. 2 is a sectional view from above of the device of FIG. 1.

FIGS. 1 and 2 show a combination catalytic converter and filter 10 for an internal combustion engine such as diesel engine 12. The combination catalytic converter and filter is provided by a single unitary flow member having an upstream frontside 14 and a downstream backside 16. Member 10 has a plurality of flow channels 18 extending axially from upstream frontside 14 to downstream backside 16. Each channel has left and right sidewalls such as 20 and 22 formed by pleated filter media 24, and top and bottom walls formed by respective upper and lower boundary layers 26 and 28. Left and right sidewalls 20 and 22 extend axially continuously from upstream frontside 14 to downstream backside 16. The sidewalls have upstream sections 30, 32, etc. proximate frontside 14, and downstream sections 34, 36, etc. proximate backside 16. Upstream sections 30, 32, etc. provide a catalytic section 33 treated with a catalyst for the exhaust. Downstream sections 34, 36, etc. provide a filter section 35 and have axially spaced alternately blocking sealants 38, 40, etc. in alternate channels such that exhaust flow must pass through pleated filter media 24 in filter section 35, as shown at arrows such as 37. Each of left and right sidewalls 20, 22, etc. extends axially rectilinearly from catalytic section 33 to filter section 35, maintaining exact axial alignment of the respective channels including the catalyzing and filtering sections thereof. Pleated filter media 24 is a continuous sheet spanning both catalytic section 33 and filter section 35.

In one preferred embodiment, catalytic section 33 is upstream of filter section 35. A first set of alternating blocking sealants 38, etc. are at the upstream ends of respective channels in filter section 35, and a second set of alternating blocking sealants 40, etc. are at downstream ends of respective channels in filter section 35. In this embodiment, it is preferred that the sidewalls of the channels of catalytic section 33 are perforated as shown at 42 such that exhaust flows through catalytic section 33 along a first set of alternate channels such as 43 rectilinearly aligned with a first set of alternate channels such as 44 in filter section 35, and exhaust also flows through catalytic section 33 along a second set of alternate channels such as 46 laterally offset from first set of channels 43 and communicating therewith through the perforations 42, such that exhaust flows through all of the channels of catalytic section 33 notwithstanding the noted alternating blocking sealants 38, 40 in filter section 35. Exhaust flow through all of the channels of catalytic section 33 is desirable to increase surface area for catalytic activity. In this embodiment, the noted first set of alternate channels 43 in catalytic section 33 are open at their downstream ends 47, and exhaust flows rectilinearly from such first set of channels 43 in catalytic section 33 to first set of alternate channels 44 in filter section 35. The downstream ends of the first set of channels 44 in filter section 35 are blocked by the noted second set of alternating blocking sealants 40. The noted second set of alternate channels 46 in catalytic section 33 are blocked at their downstream end by the noted first set of alternating blocking sealants 38 in the upstream ends of second set of alternate channels 48 in filter section 35. Perforations 42 are upstream of the noted first set of alternating blocking sealants 38, such that exhaust flows axially along the noted second set of channels 46 in catalytic section 33 and then laterally through perforations 42 as shown in dashed line at arrows such as 49 in FIG. 2 and joins the flow in the first set of channels 43 in catalytic section 33 flowing axially rectilinearly into the noted first set of channels 44 in filter section 35. Sealant is applied along the upper pleat tips as shown at 39 downstream of perforations 42, to seal the upper tips of pleated filter media 24 to upper boundary layer 26. Sealant is applied along the lower pleat tips as shown at 41 downstream of perforations 42, to seal the lower tips of pleated filter media 24 to lower boundary layer 28.

Figure 3:
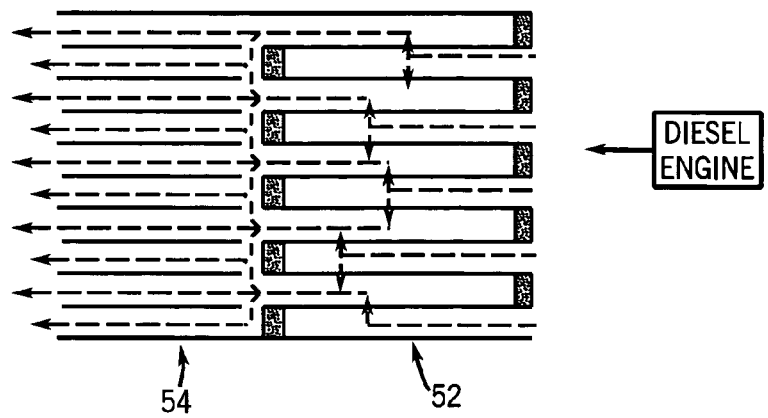
FIG. 3 is a view like FIG. 2 and shows another embodiment.
Figure 4:
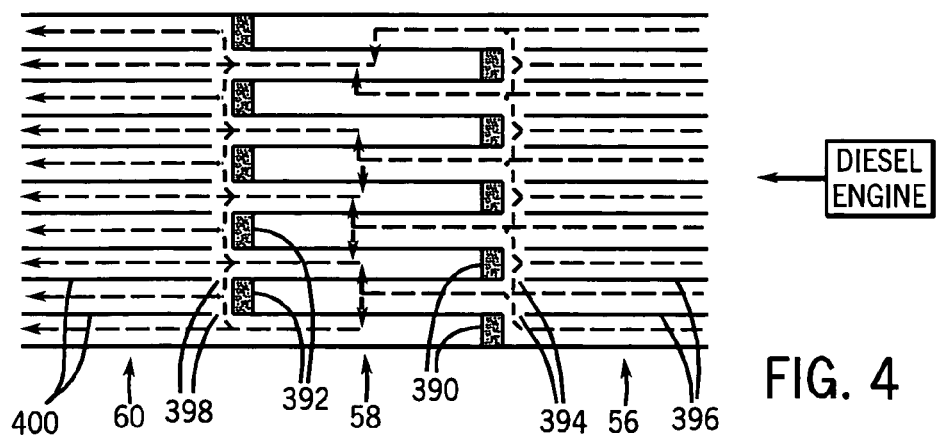
FIG. 4 is a view like FIG. 2 and shows another embodiment.

In another embodiment, the catalytic section may be downstream of the filter section, as shown in FIG. 3 at upstream filter section 52 and downstream catalytic section 54. In a further embodiment, a second catalytic section may be added to the configuration of FIG. 2 downstream of the filter section, such that a filter section is nested between two catalytic sections, i.e. catalyst/filter/catalyst, for example as shown in FIG. 4 at upstream catalytic section 56, downstream filter section 58 and further downstream catalytic section 60. In another embodiment, the filter section of the unitary member is treated with a catalyst. For example, in FIG. 2, filter section 35 is further treated with a catalyst to oxidize soot or collected contaminant, while the catalytic treatment in catalytic section 33 reduces or acts upon another gaseous portion of the exhaust. Thus, the device is provided with different catalytic treatments at different sections so that separate functions occur. In further embodiments, filter sections 52, FIGS. 3 and 58, FIG. 4, may also be provided with catalytic treatment. Other combinations and sequencing are possible.

In preferred form, the device of FIG. 1 is wrapped in a spiral, for example as shown in U.S. Pat. Nos. 4,652,286 and 5,908,480, incorporated herein by reference, to provide a multilayered structure. In such embodiment, one of the upper or lower boundary layers 26 or 28 may be eliminated, because in a spiral wrap the remaining layer provides the boundary for the channels on opposite sides thereof. Boundary layers 26 and/or 28 may be formed of a sheet of filter media or may be impervious to the exhaust flow. Boundary layers 26 and/or 28 may be perforated as shown at 50 and 52 which perforations are laterally aligned with perforations 42. In another embodiment, the single row of channels in FIG. 1 may be stacked, for example as shown in incorporated U.S. Pat. No. 4,652,286, to provide a plurality of rows and columns of channels. In such stacked structure one of the boundary layers 26 or 28 may be eliminated because the remaining layer will provide a boundary layer for the channels on opposite sides thereof, e.g. if top layer 26 is omitted, then layer 28 of the second row of channels will provide the bottom wall for such second row of channels and will provide the top wall for the first row of channels therebelow.

FIGS. 5–10 and the following description thereof are taken from parent U.S. patent application Ser. No. 09/851,300, filed May 8, 2001.

Figure 5:
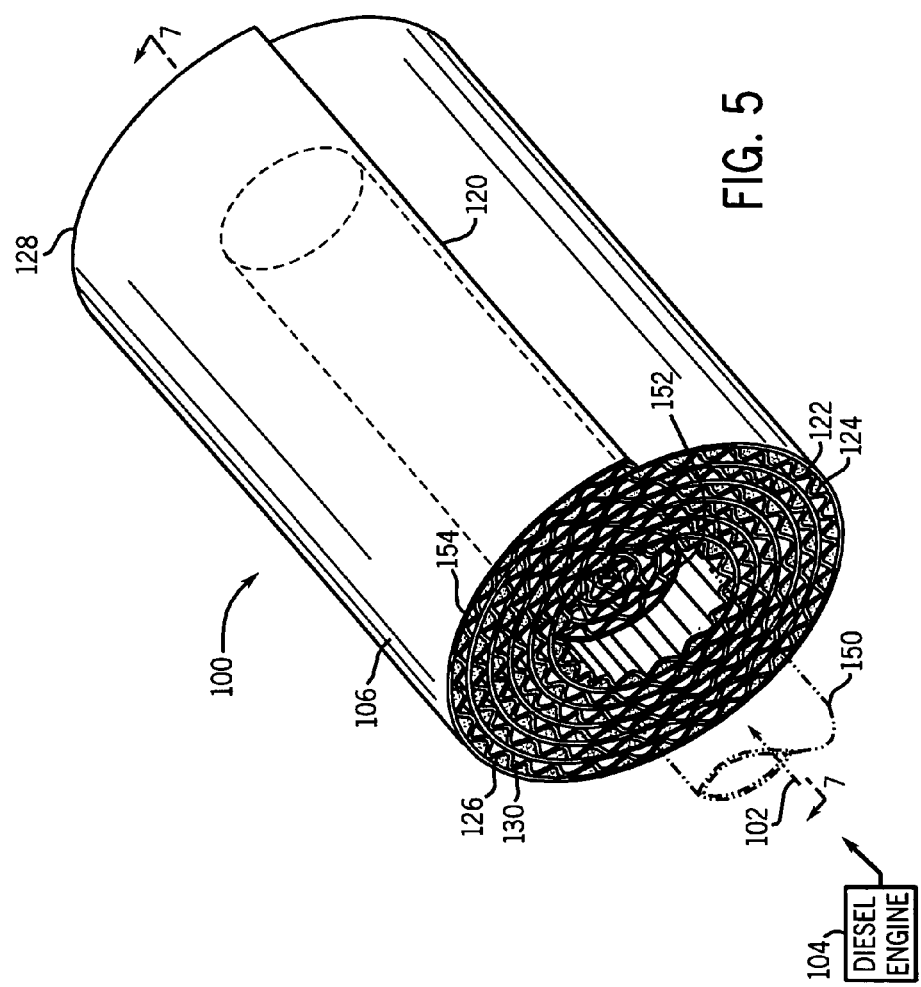
FIG. 5 is a perspective assembly view of an exhaust aftertreatment filter in accordance with the parent U.S. patent application Ser. No. 09/851,300, filed May 8, 2001.

FIG. 5 shows an exhaust aftertreatment filter 100 for filtering internal combustion engine exhaust flowing along an axial direction 102, for example exhaust from diesel engine 104. The filter is provided by an axially extending cylindrical filter roll 106 spiral-wound from a sheet 108, FIG. 6, having corrugated pleats 110 thereon. First and second axially spaced sealing beads 112 and 114, provided by adhesive sealant or the like, extend laterally across the pleats, one of the beads such as 112 being beneath the pleats, and the other bead such as 114 being on the upper surface of the pleats. The sheet is wound as shown at arrow 116 from a starting side 118 to a terminating side 120, such that the filter roll has a plurality of concentric layers with pleats therebetween defined by wall segments 122, FIG. 8, extending radially in corrugated serpentine manner between pleat tips at axially extending bend lines 124. Wall segments 122 extend axially between first and second distally opposite axial ends 126 and 128, FIGS. 5–7, and define axial flow channels 130 therebetween. Sealing beads 112 and 114 provide first and second sets of plugs 132 and 134, FIG. 7, alternately sealing flow channels 130. Wall segments 122 are alternately sealed to each other by the first set of plugs 132 to define a first set of flow channels 136 closed by plugs 132 and a second set of flow channels 138 interdigitated with first set of flow channels 136 and having open left axial ends in FIG. 7. Wall segments 122 are alternately sealed to each other by the noted second set of plugs 134 axially spaced from first set 132 and closing the noted second set of flow channels 138. First set of flow channels 136 have open rightward axial ends in FIG. 7. The filter construction described thus far as to FIG. 5 is known in the prior art.

Figure 6:
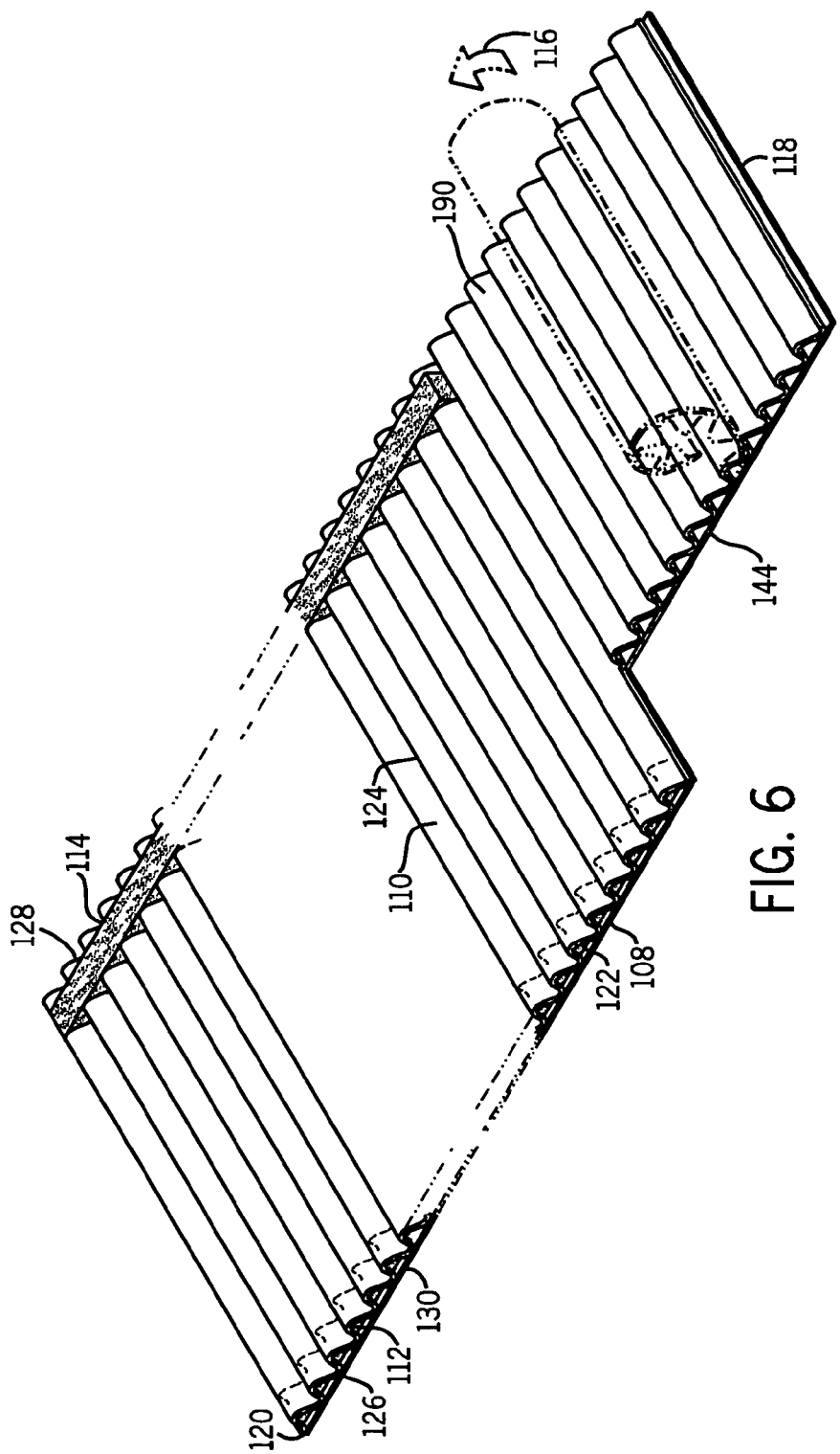
FIG. 6 is a perspective view showing an assembly step in making the filter roll of FIG. 5.
Figure 7:
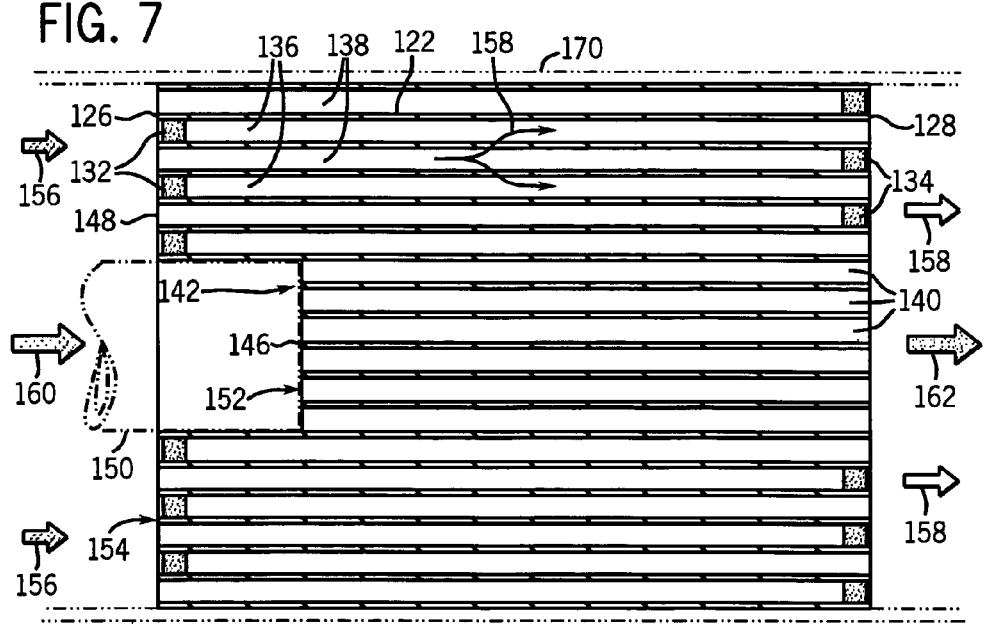
FIG. 7 is a sectional view taken along line 7—7 of FIG. 5.
Figure 8:
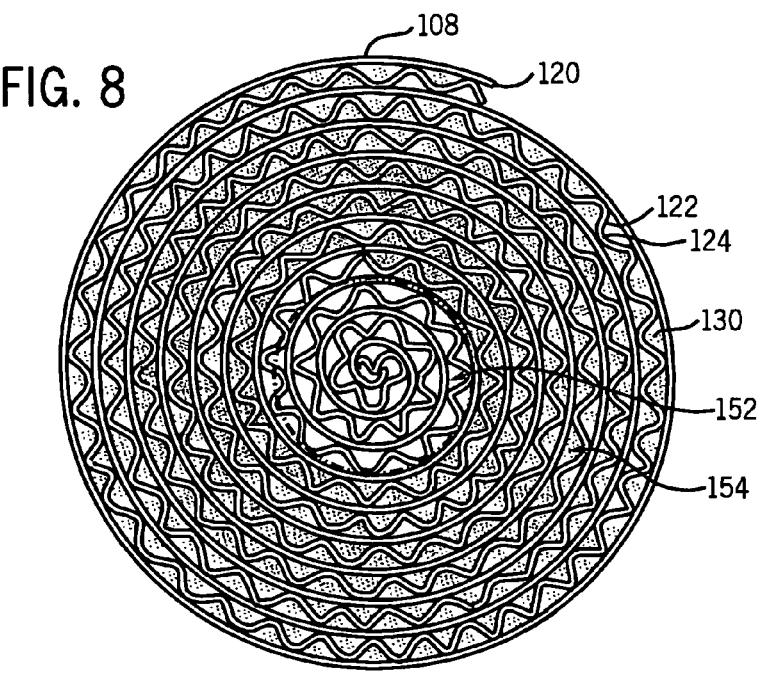
FIG. 8 is an end elevation view of the filter roll of FIG. 5.

In the preferred embodiment, sealing beads 112 and 114 are laterally spaced from starting side 118, leftwardly in FIG. 6, to provide, after the noted rolling at 116, a third set of flow channels 140, FIG. 7, as open unsealed flow channels through an inner central section 142 of the filter roll when wound. Also in the preferred embodiment, sheet 108 and pleats 110 have a cut-out section 144, FIG. 6, along starting side 118 and along left axial end 126, such that after winding, the left axial ends of wall segments 122 of inner section 142 are axially recessed at 146, FIG. 7, from the left axial ends of the wall segments at outer annular section 148 of the filter roll. This is desired to provide better sealing to exhaust tube 150 from the engine, in embodiments where such exhaust tube 150 is used, to be described. The filter roll has an inner central face 152, FIGS. 8, 5, at the left axial ends of the wall segments of central inner section 142, and an outer annular face 154 at the left axial ends of the wall segments of outer section 148. Inner face 152 is spaced axially rightwardly at 146, FIG. 7, from outer face 154 at outer annular section 148. The noted third set of flow channels 140 are open at both the left and right axial ends.

Exhaust flow axially rightwardly in FIG. 7 as shown at arrows 156 flows through outer annular filtering section 148 having the noted alternately sealed flow channels 136 and 138 forcing exhaust to flow through wall segments 122 of the pleated filter media as shown at arrows 158. The exhaust flows through the open left axial ends of flow channels 138, then axially rightwardly therein, then through wall segments 122 of the pleated filter media as shown at arrows 158 into flow channels 136, then axially rightwardly in flow channels 136, and then through the open right axial ends of flow channels 136 as shown at arrows 158. Incoming exhaust flow at arrow 160 flows axially rightwardly through the open left axial ends of flow channels 140, then axially rightwardly in flow channels 140, then through open right axial ends of flow channels 140 as shown at arrow 162. Central inner section 142 is an open-flow section with open flow channels 140. Outer annular section 148 is a filtering section with alternately sealed flow channels 136, 138 forcing exhaust to flow through the pleated filter media as shown at 158. Sealing beads 112, 114 laterally spaced from starting side 118, FIG. 6, provide open-flow section 142 of filter roll 106 when wound. In an alternate embodiment, beads 112, 114 can instead be laterally spaced from terminating side 120, FIG. 6, to provide the open-flow section of the filter roll around the outer annular section thereof, and the filtering section as the central inner section.

Figure 9:
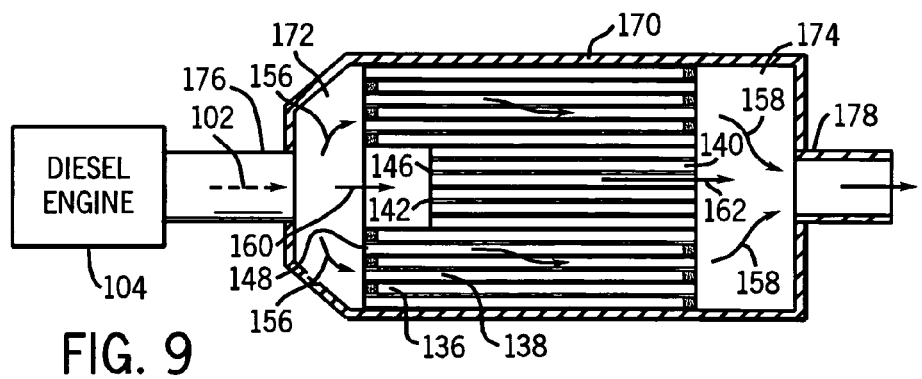
FIG. 9 is a sectional view like FIG. 7 and schematically shows a housing combination.

Filter roll 106 is provided in an axially extending housing 170, FIG. 9, enclosing the filter roll and having axially distally opposite first and second plenums 172 and 174, an inlet port 176 in plenum 172, and an outlet port 178 in plenum 174. In the embodiment of FIG. 9, inlet exhaust tube 150 of FIGS. 5 and 7 is not used. Engine exhaust flows at 102 into plenum 172 from inlet port 176, and then flows in parallel as shown at arrows 160, 156 through inner and outer sections 142 and 148, respectively, of filter roll 106 to plenum 174 to exit at outlet port 178 as shown at arrows 162, 158. Engine exhaust flows as shown at arrow 160 from inlet plenum 172 through the noted third set of flow channels 140, FIG. 7, from the open left axial ends thereof to the open right axial ends thereof then into plenum 174. This central exhaust flow is not filtered, as illustrated in FIG. 7 at stippled inlet arrow 160 which remains stippled at outlet arrow 162. Engine exhaust also flows as shown at arrows 156 from inlet plenum 172, FIG. 9, into the open left axial ends of the noted second set of flow channels 138, FIG. 7, and then is filtered by passage through wall segments 122 of outer section 148 of the filter roll and then flows out of the open right axial ends of the noted first set of flow channels 136 into plenum 174. This outer annular portion of the exhaust flow is filtered as illustrated in FIG. 7 at stippled inlet arrow 156 and unstippled outlet arrow 158. In FIG. 9, the left axial ends of the central flow channels need not be recessed at 146 because there is no inlet exhaust tube 150 to seal thereat, and hence there is no need to cut-out the section at 144 in FIG. 6.

Figure 10:
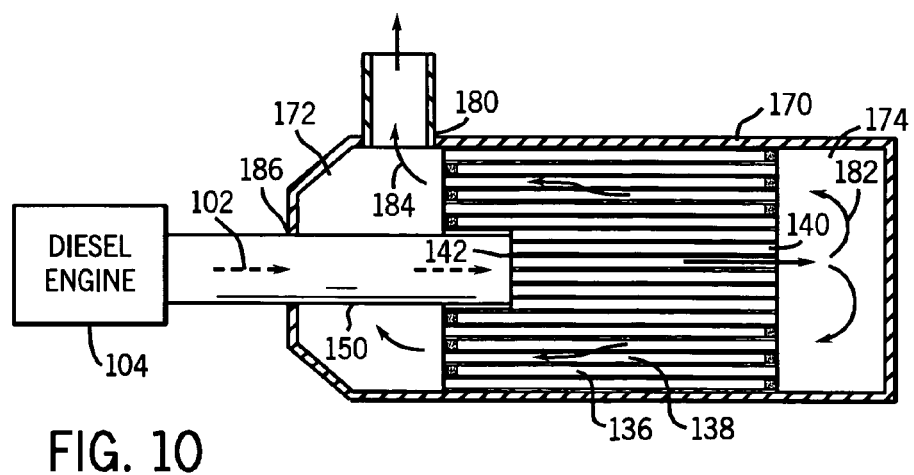
FIG. 10 is like FIG. 9 and shows another embodiment.

FIG. 10 shows another embodiment where it is desired to include cutout section 144 in FIG. 6 to provide the noted recess at 146 in FIG. 7. The filter roll is provided in axially extending housing 170 having axially distally opposite plenums 172 and 174, an outlet port 180 in plenum 172, and inlet tube 150 supplying engine exhaust at 102 to the left axial end of central inner section 142 of the filter roll to supply exhaust to the left open axial ends of the noted third set of flow channels 140. Engine exhaust flows through the third set of flow channels 140 from the open left axial ends thereof to the open right axial ends thereof, then into plenum 174 wherein exhaust flow reverses as shown at 182 and flows into the open right axial ends of the first set of flow channels 136 and then is filtered by passing through wall segments 122 of the outer annular section 148 of the filter roll and flows out of the open left axial ends of the second set of flow channels 138 into plenum 172 and then to outlet port 180 as shown at arrow 184. Plenum 172 has an inlet port 186. Inlet tube 150 extends from inlet port 186 through plenum 172 to the left axial end of central inner section 142. In an alternate embodiment, the inlet and outlet of the housing in FIG. 10 may be reversed such that exhaust flows in the opposite direction, namely exhaust flows into plenum 172 from the now inlet port 180, then into the open left axial ends of the second set of flow channels 138 and then is filtered by passing through wall segments 122 of the outer annular section 148 of the filter roll and then flows out of the open right axial ends of the first set of flow channels 136 into plenum 174 wherein exhaust flow reverses and flows through the third set of flow channels 140 from the open right axial ends thereof to the open left axial ends thereof, then through the now outlet tube 150. In such embodiment, exhaust from diesel engine 104 is supplied to port 180, and port 186 is now an outlet port, with tube 150 now an outlet tube extending from the left axial end of central inner section 142 of the filter roll through plenum 172 to the now outlet port 186.

Pleated media or corrugated pleats 110 and sheet 108 of the filter are composed of regenerable material, for example ceramic material as in U.S. Pat. Nos. 4,017,347, 4,652,286, 5,322,537, and preferably of a high temperature composite ceramic material as disclosed in commonly owned co-pending U.S. patent application Ser. No. 09/573,747, filed May 18, 2000, all incorporated herein by reference. The filter is regenerated by heat, as applied by a separate gas burner, electric resistance heating, microwave energy, etc., for example as disclosed in U.S. Pat. Nos. 5,014,509, 5,052,178, 5,063,736, all incorporated herein by reference.

Corrugated central section or inner central section 142 of the filter roll provides additional support, which is preferred over merely leaving such central section hollow, to provide a get-home feature for a truck even if the filter clogs. In addition, the starting run of pleated media 110 at 190, FIG. 6, along the span between starting side 118 and the beginning of sealing beads 112, 114, may be coated with an oxidation catalyst material, as in the noted parent '152 application, to reduce volatile organic fraction (VOF) particulate, and to act as a heater core to initiate soot light-off during operation. Central inner section 142 of the filter roll acts as a flow-through oxidation catalyst when a precious metal is applied to the pleats at 190. The particulate passing through this section would not be eliminated, but there would be reduction by oxidation of the volatile organic fraction. The added catalyst treatment may or may not be desired or needed depending upon application, such as whether the flow needs to be reversed such as in FIG. 10 for packaging or space requirements. The exothermic reaction occurring in central inner section 142 can act as a core heater to initiate filter regeneration. Upon addition of the catalytic treatment, a combination catalytic converter and filter is provided for internal combustion engine exhaust, including a first catalytic section or inner central section 142 treated with a catalyst for the exhaust, and a second filter section or outer annular section 148 with alternately sealed flow channels 136, 138 forcing exhaust to flow through the pleated filter media. In FIG. 9, the sections are in parallel such that a first portion 160 of the exhaust flows through catalytic section 142 and is catalyzed thereby, and a second portion 156 of the exhaust flows though filter section 148 and is filtered thereby. The exhaust flow through catalytic section 142 is unfiltered. In FIG. 9, housing inlet 176 supplies engine exhaust to both sections 142 and 148, and housing outlet 178 receives exhaust from both sections 142 and 148 including a first catalyzed exhaust portion 162 and a second filtered exhaust portion 158. In FIG. 10, sections 142 and 148 are in series such that engine exhaust flows serially through each. In FIG. 10, housing inlet port 186 supplies engine exhaust to section 142, and housing outlet port 180 receives engine exaust from section 148, the exaust at outlet 180 being both catalyzed and filtered.

Present Invention

FIGS. 11–13 show an exhaust aftertreatment combined filter and catalytic converter or device 202 for treating exhaust as shown at arrow 204, for example from an internal combustion engine such as diesel engine 206. Device 202 has a plurality of flow channels 208 each having both: a) a flow-through channel 210, FIG. 13, catalytically reacting with the exhaust; and b) a wall-flow channel 212 trapping particulate. Exhaust aftertreatment combined filter and catalytic converter 202 is preferably provided by a plurality of sheets 214, 216, 218, 220. As in the above noted parent '152 application, one of the upper or lower boundary layers or sheets 214 or 220 may be eliminated when the device is wound in a spiral wrap, FIG. 14, because the remaining layer provides the boundary for the channels on the opposite sides thereof. Likewise in a stacked structure with a plurality of rows and columns of channels, one of the boundary layers 214 or 220 may be eliminated because the remaining layer will provide a boundary layer for the channels on the opposite sides thereof, e.g. if top layer 220 is omitted, then layer 214 of the second row of channels will provide the bottom wall for such second row of channels and will provide the top wall for the first row of channels therebelow.

Engine exhaust flows axially along an axial flow direction as shown at arrow 204 along an axis 222 through device 202. Sheet 216 is pleated and forms with sheet 214 the noted plurality of axially extending flow channels 208. Sheet 216 has a plurality of pleats 224 defined by wall segments such as 226 and 228 extending in spaced alternating manner between pleat tips such as 230, 232, 234, 236 at axially extending bend lines such as 238, 240, 242, 244. The pleat tips on one side of sheet 216, such as pleat tips 246 and 248 on the bottom side of the sheet, are in contiguous relation with sheet 214 and bonded thereto by sealant, as in the above parent applications. The pleat tips on the other side of sheet 216, such as pleat tips 234 and 235 on the top side of the sheet, are in contiguous relation with the upper boundary layer sheet and bonded thereto with sealant, which upper boundary layer may be sheet 220 or may be the next layer wrap of sheet 214 in the case of spiral winding or may be the boundary layer for the row thereabove in the case of stacking. Sheet 218 has a plurality of pleats such as 250 defined by wall segments such as 252 and 254 extending in zig-zag manner between pleat tips such as 256 and 258 at transversely extending bend lines such as 260 and 262 which extend transversely along transverse direction 264 relative to axis 222 and transversely relative to sheet 214. Sheet 214 extends axially along axis 222 and laterally along lateral direction 266 relative to transversely extending bend lines 260, 262 of pleat tips 256, 258 of sheet 218. Axial direction 222, transverse direction 264, and lateral direction 266 are all orthogonal relative to each other.

Sheet 216 is rectangularly pleated and has spanning segments 268 extending laterally between respective adjacent wall segments 226 and 228 of sheet 216 such that the respective flow channel 208 is bounded by distally laterally spaced wall segments 226 and 228 of sheet 216 defining flow channel 208 therebetween, and by a respective spanning segment 268 distally spaced transversely from sheet 214 and defining flow channel 208 therebetween. Wall segments 252 and 254 of sheet 218 are nested in flow channel 208 between wall segments 226 and 228 of sheet 216. At least one of the sheets, preferably sheet 218, and preferably all of the sheets are composed of regenerable filter media material, for example ceramic material as in U.S. Pat. Nos. 4,017,347, 4,652,286, 5,322,537, and commonly owned co-pending U.S. patent application Ser. No. 09/573,747, filed May 18, 2000, all incorporated herein by reference. Sheet 218 is porous material filter media. Sheet 216 is preferably porous to facilitate catalyst coating, to be described, though may be non-porous. Sheets 214 and/or 220 may be porous or non-porous. Other types of regenerable media may be used, for example cordierite, silicon carbide, and other materials. The filter is regenerated by heat, for example heat from the exhaust, or as applied by a separate gas burner, electric resistance heating, microwave energy, etc., for example as disclosed in U.S. Pat. Nos. 5,014,509, 5,052,178, 5,063,736, and commonly owned co-pending U.S. patent application Ser. No. 09/865,098, filed May 24, 2001, and Ser. No. 09/935,847, filed Aug. 23, 2001, Ser. No. 09/935,849, filed Aug. 23, 2001, all incorporated herein by reference.

As above noted, flow channel 208 is defined by first and second laterally distally spaced wall segments 226 and 228 of second sheet 216, and a respective spanning segment 268 transversely spaced from first sheet 214. Wall segments 252 and 254 of third sheet 218 have laterally spaced portions 270 and 272, FIG. 13, in the respective flow channel 208 at the upstream end thereof and extending axially to a respective downstream pleat tip 258. Wall segment 252 of sheet 218 at pleat tip 258 is laterally spaced from wall segment 226 of sheet 216. Wall segment 254 of sheet 218 at pleat tip 258 is laterally spaced from wall segment 228 of sheet 216. Wall segments 252 and 254 of sheet 218, spanning segment 268 of sheet 216, and sheet 214 form wall-flow channel 212 therebetween terminating at downstream pleat tip 258 of sheet 218, such that exhaust passes through wall segments 252 and 254 of sheet 218 such that particulate, e.g. soot, is trapped and stored thereat. At least a portion of flow channel 208 is treated with a catalyst, to be described, and provides a flow-through channel. Wall segments 252 and 254 of sheet 218 have lower edges 253 in contiguous relation with sheet 214 and bonded thereto with sealant, and have upper edges 255 in contiguous relation with spanning segments 268 and bonded thereto with sealant.

Wall segments 252 and 254 of sheet 218 converge to a V-shaped apex pointing downstream at pleat tip 258, FIG. 13. Wall segment 252 of sheet 218 has a first face 274, laterally facing wall segment 254 of sheet 218, and has a second opposite face 276 laterally facing wall segment 226 of sheet 216. Wall segment 254 of sheet 218 has a first face 278 laterally facing wall segment 252 of sheet 218, and has a second opposite face 280 laterally facing wall segment 228 of sheet 216. Wall segment 226 of sheet 216 has a face 282 laterally facing wall segment 252 of sheet 218. Wall segment 228 of sheet 218 has a face 284 laterally facing wall segment 254 of sheet 218. This structure provides a number of substrate surfaces which can be treated with one or more catalysts. In the preferred embodiment, at least one of the noted faces 274, 276, 278, 280, 282, 284 is catalytically treated. In one embodiment, faces 276 and 280 are catalytically treated. In another embodiment, faces 274 and 278 are catalytically treated. In a further embodiment, faces 274, 276, 278, 280 are catalytically treated. In a further embodiment, faces 282 and 284 are catalytically treated. In further embodiments, to be described, face 282 is treated with different catalytic materials, for example to provide a first catalytic reaction or reduction in flow-through channel 210 immediately adjacent wall-flow channel 212, and a different catalytic reaction further downstream in flow-through channel 210. In this embodiment, face 284 is likewise treated with different catalytic materials to provide different catalytic reactions along flow-through channel 210. In another embodiment, all of the faces 274, 276, 278, 280, 282, 284 are catalytically treated. This latter embodiment is illustrated in FIG. 15, with catalytically treated surface 286 on faces 274, 278, catalytically treated surface 288 on faces 276, 280, and catalytically treated surface 290 on faces 282, 284. Catalytically treated surface 290 may include a first upstream section 292 treated with a first catalytic material, and a second downstream section 294 treated with a second different catalytic material, for providing different catalytic reactions, to be further described.

FIG. 16 shows another embodiment and uses like reference numerals from above where appropriate to facilitate understanding. In FIGS. 11–15, sheet 218 is nested in flow channels 208 from the upstream end 302 of the device. In FIG. 16, sheet 304 is like sheet 218, but sheet 304 is nested in flow channels 208 from the downstream end 306 of the device. In this embodiment, wall segments 308 and 310 of sheet 304 converge to a V-shaped apex pointing upstream at pleat tip 312. The construction of FIG. 16 may be rolled or stacked, as above, and may be catalytically treated at various surfaces, as above.

FIGS. 17 and 18 show another embodiment and use like reference numerals from above where appropriate to facilitate understanding. Sheet 304 in FIG. 16 is replaced by sheet 320 in FIG. 17. Sheet 320 is nested in flow channels 208 from downstream end 306. Sheet 320 has wall segments 322 and 324 having laterally spaced upstream portions 326 and 328 in the respective flow channel 208 and extending axially to a respective downstream pleat tip 330. Wall segments 322 and 324 of sheet 320 converge to a V-shaped apex pointing downstream at pleat tip 330. The wall-flow channel 332 in FIG. 17 trapping particulate such as soot in a V-shaped apex pointing downstream is preferred over the wall-flow channel 334 in FIG. 16 having the noted V-shaped apex pointing upstream.

In FIGS. 17 and 18, wall segment 322 of sheet 320 at pleat tip 330 is laterally spaced from wall segment 226 of sheet 216. Wall segment 324 of sheet 320 at pleat tip 330 is laterally spaced from wall segment 228 of sheet 216. Wall segments 322 and 324 of sheet 320, the respective spanning segment 268 of sheet 216, and sheet 214 form wall-flow channel 332 therebetween terminating at downstream pleat tip 330 of sheet 320, such that exhaust passes through wall segments 322 and 324 of sheet 320, which wall-flow channel traps and stores particulate thereat. The flow channel upstream and/or downstream of wall-flow channel 332 is treated with a catalyst, to be described, providing a flow-through channel catalytically reacting with the exhaust.

Sheet 320, FIGS. 17, 18, has third and fourth laterally spaced wall segments 336 and 338 in the same flow channel 208 as the first and second wall segments 322 and 324 of sheet 320. First and third wall segments 322 and 336 of sheet 320 extend axially to an upstream pleat tip 340 in flow channel 208. Wall segments 322 and 336 converge to a V-shaped apex pointing upstream at pleat tip 340. Pleat tip 340 extends along a transverse bend line along the noted transverse direction 264. Second and fourth wall segments 324 and 338 of sheet 320 extend axially to another upstream pleat tip 342 in flow channel 208. Second and fourth wall segments 324 and 338 converge to a V-shaped apex pointing upstream at pleat tip 342. Pleat tip 342 extends along a transverse bend line extending along the noted transverse direction 264. Pleat tips 340 and 342 of sheet 320 are laterally spaced from each other in flow channel 208 along the noted lateral direction 266. Pleat tip 330 of sheet 320 is axially spaced from pleat tips 340 and 342 of sheet 320. Third wall segment 336 of sheet 320 is laterally between wall segment 226 of sheet 216 and first wall segment 322 of sheet 320. Fourth wall segment 338 of sheet 320 is laterally between wall segment 228 of sheet 216 and second wall segment 324 of sheet 320.

First wall segment 322 of sheet 320 has a first face 344 laterally facing second wall segment 324 of sheet 320, and has a second opposite face 346 laterally facing third wall segment 336 of sheet 320. Second wall segment 324 of sheet 320 has a first face 348 laterally facing first wall segment 322 of sheet 320, and has a second opposite face 350 laterally facing fourth wall segment 338 of sheet 320. Third wall segment 336 of sheet 320 has a face 352 laterally facing first wall segment 322 of sheet 320. Fourth wall segment 338 of sheet 320 has a face 354 laterally facing second wall segment 324 of sheet 320. This construction provides a number of substrate surfaces, at least one of which is catalytically treated for catalytic reaction with the exhaust. In one embodiment, faces 346, 350, 352, 354 are catalytically treated. In another embodiment, faces 344 and 348 are catalytically treated. In another embodiment, faces 344, 346, 348, 350, 352, 354 are catalytically treated, as shown at catalytic coating surfaces 356, 358, FIG. 19. In another embodiment, wall segments 226 and 228 of sheet 216 upstream of wall-flow channel 332 are catalytically treated as shown at 360, providing a flow-through channel 362 catalytically reacting with the exhaust upstream of wall-flow channel 332, in addition to the catalytic reaction downstream of wall-flow channel 332 as shown at flow-through channel 364. In a yet further embodiment, catalytic surface 360 has a first upstream portion 366 treated with a first catalytic material, and a second upstream portion 368 treated with a second different catalytic material, providing differing catalytic reactions with the exhaust upstream of wall-flow channel 332 at sheet 320. In further embodiments, wall segments 226 and 228 of sheet 216 can have portions upstream and downstream of sheet 218 or sheet 320, one or both of which such upstream and downstream portions are catalytically treated.

Sheet 216 extends axially along the noted axial direction 222 from upstream axial end 302 to downstream axial end 306. In the preferred embodiment, the sheet providing the wall-flow channels, e.g. sheet 218 or sheet 320, is provided by a continuous sheet rather than individual V-shaped segments. It is preferred that the continuous sheet have a set of pleat tips at one of the axial ends 302 or 306 of sheet 216. In the embodiment of FIGS. 11–15, the set of pleat tips 256 of sheet 218 are at the upstream axial end 302 of sheet 216. In this embodiment, sheet 218 has another set of pleat tips 258 axially spaced downstream from the set of pleat tips 256 of sheet 218. In the embodiment of FIGS. 17–19, the set of pleat tips 370 of sheet 320 are at the downstream axial end 306 of sheet 216. In this embodiment, sheet 320 has another set of pleat tips 340, 342 axially spaced upstream from the set of pleat tips 370 of sheet 320. Further in such embodiment, sheet 320 has a further set of pleat tips 330 axially spaced upstream from the set of pleat tips 370 and axially spaced downstream from the set of pleat tips 340, 342. The set of pleat tips 340, 342 has two pleat tips per flow channel 208, and the set of pleat tips 330 has one pleat tip per flow channel 208.

The disclosed exhaust aftertreatment combined filter and catalytic converter is preferably provided by a plurality of sheets, at least one of which comprises filter media, preferably at least the third sheet 218 or 304 or 320, and further preferably all of the noted sheets. The first and second sheets 214 and 216 define a plurality of flow channels 208 having various portions catalytically treated and providing a plurality of flow-through channels 211, 212, 210, FIG. 13, 362, 332, 364, FIG. 17, passing exhaust therethrough and catalytically reacting therewith. Channels 212 and 332 additionally provide wall-flow channels axially overlapped with the respective flow-through channels, i.e. the wall-flow channels and the flow-through channels have sections which overlap each other along their axial length, e.g. 212a, 210a, 332a, 364a. The third sheet 218 or 304 or 320 defines with at least one of the first and second sheets the noted plurality of wall-flow channels 212 or 332, passing the exhaust through the third sheet and trapping and storing particulate such as soot thereat.

In the preferred embodiment, at least second sheet 216 is catalytically treated, and at least third sheet 218 or 304 or 320 is a filter media sheet. In further preferred embodiments, all of the sheets are filter media sheets and all of the sheets are catalytically treated. Third sheet 218 or 304 or 320 is preferably treated on both sides thereof, namely both the upstream facing side and the downstream facing side, as above described. In each of the embodiments, plural catalytically treated serially sequential surfaces are provided along which exhaust flows. For example, in FIGS. 13 and 15, exhaust flows firstly along first sequential catalytically treated surfaces 286 at faces 274, 278, then secondly along second sequential catalytically treated surfaces 288 at faces 276, 280, then thirdly along third sequential catalytically treated surfaces 290 at faces 282, 284. In FIG. 15, exhaust flows along sequential catalytically treated surfaces 292, and then along sequential catalytically treated surfaces 294. In FIGS. 17 and 19, exhaust flows along sequential catalytically treated surfaces 366, then along sequential catalytically treated surfaces 368, then along sequential catalytically treated surfaces 356 at faces 344, 348, then along sequential catalytically treated surfaces 358 at faces 346, 350, then along sequential catalytically treated surfaces 358 at faces 352, 354. The combination of the flow-through channels and the wall-flow channels have plural catalytically treated surfaces in axially overlapped channel sections, for example axially overlapped channel sections 212a, 210a in FIG. 13, and axially overlapped channel sections 332a, 364a in FIG. 17.

The disclosed construction is particularly useful in exhaust emission control regeneration methods and systems, to be described, including diesel engine exhaust aftertreatment and regeneration, and including $NO_x$ abatement.

The noted exhaust emission control method involves: passing the exhaust through a particulate filter from an upstream side thereof to a downstream side thereof to trap exhaust particulate in the particulate filter; after passage through the particulate filter, passing the exhaust along a catalyst downstream of the particulate filter; regenerating the particulate filter by combusting the trapped particulate, and producing a combustion product from the combustion of the particulate; and regenerating the downstream catalyst with the noted combustion product. The downstream catalyst is provided in sufficiently close proximity to the diesel particulate filter to allow more selective utilization of the noted combustion product for assisting in abatement of $NO_x$ as described below. Exhaust is passed axially along an axial flow path comprising a flow channel 208 having a wall-flow channel 212, 332 providing the diesel particulate filter and having a flow-through channel 210, 364 axially aligned with the wall-flow channel and providing the catalyst. The noted sufficiently close proximity is provided by axially overlapping sections of the wall-flow channel and the flow-through channel, as above noted. Other embodiments may be used to provide the noted sufficiently close proximity. The method is particularly useful for diesel engine exhaust, wherein the downstream catalyst is an $NO_x$ adsorber.

In a particularly desirable diesel engine exhaust aftertreatment control and regeneration method, the noted combustion product is a soot oxidation product, e.g. CO, and the noted downstream $NO_x$ adsorber is regenerated with the assistance of CO derived from the oxidation of the diesel particulate matter. The downstream $NO_x$ adsorber is provided in sufficiently close proximity to the diesel particulate filter to maximize the probability that the CO will assist in regeneration of the $NO_x$ adsorber as described below. Preferably, the CO assists $NO_x$ adsorber regeneration by releasing stored $NO_x$, for example according to $Ba(NO_3)_2 + 3CO \rightarrow BaCO_3 + 2NO + 2CO_2$. Furthermore, the CO preferably assists in regeneration of the $NO_x$ adsorber by reducing the released $NO_x$ to benign $N_2$, for example according to $NO + CO \rightarrow \frac{1}{2}N_2 + CO_2$. Furthermore, the CO preferably assists in regeneration of the $NO_x$ adsorber by oxidizing CO (either through one of the above two reactions, or by reaction with $O_2$ over the noble metal component of the $NO_x$ adsorber according to $CO + \frac{1}{2}O_2 \rightarrow CO_2$) with substantial heat release. Close proximity of the particulate filter to the $NO_x$ adsorber allows efficient utilization of this heat to assist regeneration of both devices.

The disclosed method is particularly useful for reducing wasteful loss of CO to parasitic oxidation in an emission control regeneration system for diesel engine exhaust wherein exhaust is passed through a diesel particulate filter from an upstream side thereof to a downstream side thereof to trap diesel exhaust particulate, including soot, in the diesel particulate filter. The diesel particulate filter is regenerated by combusting the soot to produce CO. An $NO_x$ adsorber is provided downstream of the diesel particulate filter, and enhances the chances of the CO helping regeneration of the $NO_x$ adsorber by locating the downstream $NO_x$ adsorber in sufficiently close proximity to the downstream side of the diesel particulate filter. The exhaust is passed axially along an axial flow path 204 through a flow channel 208 having a wall-flow channel 212, 332 providing the diesel particulate filter and having a flow-through channel 210, 364 providing the downstream $NO_x$ adsorber. The noted chances of the CO helping regeneration of the $NO_x$ adsorber are enhanced by axially aligning the flow-channel and the wall-flow channel along the axial flow path, as above described, concomitantly providing both the noted sufficiently close proximity and the noted axial alignment by axially overlapping sections of the wall-flow channel and the flow-through channel. Other embodiments may be used to provide the noted sufficiently close proximity.

In the present emission control system for diesel engine exhaust, the diesel particulate filter passes the exhaust therethrough from an upstream end to a downstream end and traps diesel exhaust particulate, including soot. In a further embodiment, at least one of such ends is coated with a catalyst facilitating heat generation and soot combustion to regenerate the diesel particulate filter. In preferred form, each of the upstream and downstream ends is coated with a catalyst facilitating heat generation and soot combustion to regenerate the diesel particulate filter at each of such ends, which is where soot tends to accumulate.

As above noted, the disclosed construction is particularly useful for facilitating exhaust aftertreatment and regeneration methods and systems, including enhanced $NO_x$ abatement in diesel engine exhaust. The latter method involves trapping and storing soot with a wall-flow channel, oxidizing the soot, for example according to C+Oxidant→CO, providing a flow-through channel sufficiently proximate the wall-flow channel to further carry out the reaction of the CO with the $NO_x$ stored over $NO_x$ adsorber material, for example according to $Ba(NO_3)_2+3CO \rightarrow BaCO_3+2NO+2CO_2$; also carrying out the reaction of reducing the released $NO_x$ to benign $N_2$, for example according to $NO+CO \rightarrow \frac{1}{2}N_2+CO_2$; also, oxidizing the CO (either through one of the above two reactions, or by reaction with $O_2$ over the noble metal component of the $NO_x$ adsorber according to $CO+\frac{1}{2}O_2 \rightarrow CO_2$) with substantial heat release. Close proximity of the particulate filter to the $NO_x$ adsorber allows efficient utilization of this heat to assist regeneration of both devices. This method involves providing the wall-flow channel and the flow-through channel in a combined filter and catalytic converter having axially overlapped channel sections providing sufficiently close proximity of the wall-flow channels and flow-through channels to carry out the noted further reaction. The wall-flow channel and the flow-through channel have axially overlapped channel sections, as shown at 211, 212, 210, FIG. 13, and 362, 332, 364, FIG. 17. The device has plural surfaces including at least one filter surface and at least one catalytic surface, the surfaces forming the flow-through channel passing exhaust through such channel and along the catalytic surface and catalytically reacting therewith, and defining in the noted axially overlapped sections the wall-flow channel passing the exhaust through filter media at the filter surface and trapping particulate thereat. Other embodiments may be used to provide the noted sufficiently close proximity.

In usual prior art configurations, a lean $NO_x$ trap or adsorber and a diesel particulate filter are two separate modules placed consecutively in one or another order along the exhaust system. Such configuration presents a number of problems. As to chemical efficiency, the reduction of $NO_2$ with soot leading to harmless products, namely $NO_2+C \rightarrow NO+CO \rightarrow \frac{1}{2}N_2+CO_2$, is thermodynamically favorable. However, in traditional prior art configurations, when the lean $NO_x$ trap or adsorber and diesel particulate filter represent two separate units, selectivity to the noted process is low because CO is parasitically oxidized before reaching the $NO_x$ adsorber. In fact, $NO_2$ is known to assist regeneration of the diesel particulate filter, but soot does not usually help in reducing $NO_2$ to $N_2$. Thus, the reducing capacity of soot is not utilized for $NO_x$ abatement; instead, external reductants have to be injected in the system for such purpose. As to heat management, temperature is a critical issue in regeneration of both the lean $NO_x$ trap and the diesel particulate filter. For a number of applications, implementation of the lean $NO_x$ trap and the diesel particulate filter would require additional heating, e.g. electrical, microwave, burning of hydrocarbons, etc., during regeneration events. Separate heating of the lean $NO_x$ trap and the diesel particulate filter would pose additional engineering complications and extra fuel penalty. Heating of only the upstream unit may be inefficient due to the temperature losses between the two units. Both the lean $NO_x$ trap and the diesel particulate filter under certain operating conditions may produce a significant exotherm, for example the diesel particulate filter during soot combustion, and the lean $NO_x$ trap following the injection of the reductant. With the separated locations of the lean $NO_x$ trap and the diesel particulate filter, the heat generated by one component is not effectively utilized by the other component, especially if the heat is produced over the downstream unit. As to engineering, each of the two possible consecutive component combinations compromises the performance of the entire system to some extent. For example, if the diesel particulate filter is located upstream of the lean $NO_x$ trap, then particulates, which may be formed during injections of the reductant for the lean $NO_x$ trap regeneration, would escape directly to the atmosphere. Further, total space requirements are significant for two separate units.

The present construction and method combines the lean $NO_x$ trap and the diesel particulate filter into one unit. This provides a number of advantages. As to chemical advantages, the close proximity of the soot and the trapped $NO_x$ allows utilization of the reducing power of soot to assist $NO_x$ release and abatement, thus reducing the requirements for external reductant, and hence lowering the fuel penalty. As to improved heat management, heat losses are decreased, and there is better utilization of the operational exotherms. Lower overall heat mass improves cold start operation and minimizes external heat requirements, hence fuel penalty, for regeneration of the lean $NO_x$ trap and diesel particulate filter. Usage of the low heat mass substrates emphasizes this advantage. As to engineering advantages, combination of the two elements eliminates the noted operational compromises, and minimizes space requirements. The overall result is lower fuel penalty and reduced size of the aftertreatment system. In one embodiment, the combination of the lean $NO_x$ trap and diesel particulate filter is achieved by coating the lean $NO_x$ trap material over the diesel particulate filter substrate. In further embodiments, close proximity of $NO_x$ adsorbing material and soot allows utilization of reductant, derived from soot oxidation, for the $NO_x$ adsorber regeneration, i.e. $NO_x$ release and reduction to $N_2$, and also improves heat efficiency of the system. The combined lean $NO_x$ trap and diesel particulate filter has numerous applications for exhaust aftertreatment, including in EGR, exhaust gas recirculation, equipped engines (brings the soot/$NO_x$ ratio closer to stoichiometry) and in low exhaust temperature engine applications, requiring active regeneration.

In exhaust gas purification of a lean burn or diesel engine, the lean $NO_x$ trap and the diesel particulate filter components are arranged in close, preferably intimate, proximity to each other. Due to such arrangement, the reductant derived from soot can assist regeneration of the lean $NO_x$ trap and destruction of $NO_x$. Also, the heat efficiency of the system is improved. These two factors contribute to lower fuel penalty associated with the regeneration of the lean $NO_x$ trap and the diesel particulate filter. A significant advantage of the diesel particulate filter being ahead of the $NO_x$ adsorber is extended interval time, i.e. the length of time, between regenerations.

In a further aspect, the present system provides integrated four-way catalytic substrates for use in controlling diesel engine particulate and gaseous emissions. The substrates integrate wall-flow diesel particulate filters with flow-through catalytic converters. The substrates are space efficient and simultaneously remove the four primary pollutants produced by diesel engines, namely particulate matter, oxides of nitrogen, carbon monoxide, and hydrocarbons.

With the present construction, a single device can provide enough independent surfaces for the coatings of proven catalysts to regenerate particulate filters and to reduce the three gaseous pollutants. Because of increasingly stringent standards, significant reduction in particulates, oxides of nitrogen, carbon monoxide, and hydrocarbon emissions from diesel engine applications will be required. Currently in engine aftertreatment technology, diesel particulates are controlled through the application of soot traps that are coated with proven catalytic elements for the purpose of trap regeneration. On the other hand, emissions of $NO_x$ are converted into nitrogen through the use of flow-through converters which are coated with $NO_x$ reduction catalytic elements, while emissions of CO and HC are converted into $CO_2$ and $H_2O$ by the use of separate flow-through converters that are coated with CO and HC reduction catalytic elements. In contrast, the present construction and method provides a complete aftertreatment system including wall-flow channels and flow-through channels to support different catalyst coatings for controlling the four primary pollutants.

The present construction provides flow channels as shown at 208, including particulate traps or wall-flow channels such as 212, 332, 334 integrated with flow-through channels such as 211, 210, 362, 364. Engine exhaust gases flow across and into the substrates through flow channels 208. Diesel particulate emissions are filtered by traps 212, 332, 334. Traps 212, 332 with their V-shape pointing downstream with walls 252, 254, 322, 324 converging to an apex at pleat tip 258, 330, provide a more uniform flow pattern than conventional wall-flow traps such as provided by alternately plugged flow channels, for example U.S. Pat. Nos. 4,652,286, 5,322,537, both incorporated herein by reference. The uniform flow pattern increases the soot holding capacity of the traps, and reduces flow restriction of the system. The downstream faces 276, 280 of the wall-flow channels or traps 212 and the faces 282, 284 of the flow-through channels 210 are coated with catalytic elements for $NO_x$ conversion and for CO and HC reduction, respectively. Clean gases exit the flow channels at downstream end 306. The substrates are preferably of composite ceramic material as above noted, though alternatively can be made through molding or extrusion with cordierite, silicon carbide, and other materials. The substrates are compact and efficient. The wall-flow channels and flow-through channels are integrated with optimized flow channels 208. The integrated substrates perform with high soot holding capacity and low restriction in the engine exhaust system.

For SCR, selective catalytic reduction, systems, it is preferred to coat surfaces 276, 280, 346, 350 with $NO_x$ catalyst elements, and to coat surfaces 282, 284 with oxidation catalyst elements for controlling ammonia slip and CO and HC emissions. Desirable SCR systems are those shown in commonly owned co-pending U.S. patent application Ser. No. 09/981,171, filed Oct. 17, 2001, and Ser. No. 09/981,157, filed Oct. 17, 2001, both incorporated herein by reference. Because wall-flow channels or traps 212, 332 and channel surfaces 282, 284, 336, 338 are more closely located compared with conventional systems with more than one element or substrate, the present construction is more thermally efficient. In FIG. 15, the flow-through channels 210 are made longer and can be coated part of the way with $NO_x$ catalyst elements as shown at 292, and coated the rest of the way with CO and HC catalyst elements as shown at 294. For lean $NO_x$ or $NO_x$ adsorber applications, surfaces 276, 280, 282, 284 are coated with oxidation catalyst, e.g. precious metal, on a ceramic composite substrate for HC/CO control and diesel particulate filtering, and lean $NO_x$ catalyst or $NO_x$ adsorber is coated at surfaces 292, 294, FIG. 15, on a ceramic composite substrate for $NO_x$ control. For SCR applications, an SCR catalyst is coated at surfaces 276, 280, 282, 284, FIGS. 13, 15, on a ceramic composite substrate for $NO_x$ control and diesel particulate filtering, and an oxidation catalyst is coated on surfaces 292, 294 for CO/HC control and ammonia slip.

In a further aspect, the present construction provides a diesel exhaust aftertreatment device which incorporates components to control diesel particulates and $NO_x$ in a manner to facilitate regeneration of the filter by combustion of captured particulates such as soot. Diesel engines emit undesirable levels of $NO_x$, particulates, CO, and hydrocarbons HC. Typically, diesel particulate filters are used to control particulate emissions, while a variety of technologies, for example urea selective catalytic reduction, lean $NO_x$ and $NO_x$ adsorber technologies, are used to control $NO_x$. CO and HC are typically controlled using precious metal, e.g. Pt, platinum, catalysts. The present construction enhances regeneration of the diesel particulate filter and $NO_x$ removal in a compact, simple and efficient structure.

In a further implementation, the device is provided with localized heating. For example, localized heaters 382, FIG. 19, electrical, thermal and/or microwave, may be provided by electrical and/or thermal conductors wound with the sheets in the filter roll, providing regeneration at lateral slices of the filter roll lying in a plane extending transversely and radially relative to the filter roll axis, for example as in commonly owned co-pending U.S. patent application Ser. No. 09/935,849, filed Aug. 23, 2001, incorporated herein by reference. In a further embodiment, an injector 380 is provided to inject urea or ammonia into the SCR section.

In another embodiment, FIG. 4, the structure of the noted '152 application is utilized, and a series of holes or perforations provided through the channel walls downstream of the second set of plugs to facilitate flow through all channels of the final section. A first set of upstream channel plugs are provided at 390, and a second set of downstream channel plugs are provided at 392. A first set of holes or perforations can be provided at 394 and/or channel walls 396 can be filter material through which the exhaust flows. A second set of holes or perforations 398 in channel walls 400 downstream of the second set of plugs 392 facilitate flow through all channels of the final section at 60. Various sections of the device may be coated with one or more catalysts.

The present system also provides a technique for applying three or more different coatings along the length of the device. For example, consider a device with entry, intermediate, and final sections. One axial end of the sheet is dipped into coating material to coat the entry section, followed by drying, then dipping of the other axial end of the sheet into the coating material to coat the final section. A different coating can be accomplished on the intermediate section by initially coating the entry section with an easily removed wax or resin, then dipping the sheet into the different coating material past the entry section, and onto the intermediate section, and then also coating the final section by dipping that end in a different coating. The part is then dried and fired to melt or burn away the wax or resin and fix the coating on the intermediate section and on the final section. Now the part is dipped a final time to coat only the entry section. This technique can also be performed by reversing the roles of the entry and final sections, i.e. coating the final section with the wax or resin. The process can be expanded to more than three sections with further steps and wax or resin temporary coatings. This enables production of a catalyst/filter/catalyst or similar part with nested sections each having a unique catalyst formulation.

In another embodiment, flow channels 208 are provided by extruded cordierite, which may be formed in a stacked array having a plurality of rows stacked on each other. In this embodiment, the extrusion is performed as a first step, providing the flow-through channels, and then folded pleated zig-zag sheet 218 or 304 or 320 is inserted into such channels in nested relation to provide the wall-flow channels or traps.

The present system provides an exhaust emission control method including: passing exhaust through a particulate filter from an upstream side thereof to a downstream side thereof to trap exhaust particulate in the particulate filter; after passage through the particulate filter, passing the exhaust along a catalyst downstream of the particulate filter; regenerating the particulate filter by combusting the trapped particulate, and producing a combustion product from the combustion of the trapped particulate; and using the combustion product to assist regeneration of the downstream catalyst. The downstream catalyst is provided in sufficiently close proximity to the particulate filter to carry out a thermodynamically favorable reaction with the combustion product. The exhaust is passed axially along an axial flow path including a flow channel having a wall-flow channel providing the particulate filter and having a flow-through channel axially aligned with the wall-flow channel in the flow channel and providing the downstream catalyst. The downstream catalyst is provided in the noted sufficiently close proximity to the particulate filter by axially overlapping sections of the wall-flow channel and the flow-through channel. Other embodiments may be used to provide the noted sufficiently close proximity. The system is particularly desirable for use in a diesel engine exhaust system wherein the particulate filter is a diesel particulate filter trapping diesel exhaust particulate, including soot, and wherein the downstream catalyst is an $NO_x$ adsorber having an $NO_x$ storage element and an $NO_x$ catalyst, wherein the $NO_x$ storage element is selected from the group consisting of alkali and alkaline earth oxide compounds, preferably in the form of oxide, carbonate or nitrate, with the $NO_x$ storage element preferably selected from the group consisting of compounds of Ba, Li, Na, K and Ca, and wherein the catalyst is a precious metal catalyst, such as Pt. In such embodiment, the combustion product is CO, and the downstream $NO_x$ adsorber is provided in sufficiently close proximity to the diesel particulate filter to carry out the thermodynamically favorable reaction with CO, such that the downstream $NO_x$ adsorber is regenerated with the CO derived from the diesel particulate filter in the noted sufficiently close proximity thereto. The reaction includes $NO+CO \rightarrow \frac{1}{2}N_2+CO_2$. The method further includes oxidizing soot in the diesel particulate filter, providing the downstream $NO_x$ adsorber in sufficiently close proximity to the diesel particulate filter to further carry out the reaction according to $NO+CO \rightarrow \frac{1}{2}N_2+CO_2$. The method also generates $CO_2$ from CO according to $O_2+CO \rightarrow CO_2$. The system further provides a method of reducing wasteful loss of CO to oxidation in an exhaust emission control regeneration method for diesel engine exhaust wherein the exhaust is passed through a diesel particulate filter from an upstream side thereof to a downstream side thereof to trap diesel exhaust particulate, including soot, in the diesel particulate filter, wherein the diesel particulate filter is regenerated by combusting the soot to produce CO, the method including providing an $NO_x$ adsorber downstream of the diesel particulate filter, and enhancing the chances of the CO helping regeneration of the downstream $NO_x$ adsorber by locating the downstream $NO_x$ adsorber in sufficiently close proximity to the downstream side of the diesel particulate filter. The exhaust is passed axially along an axial flow path having a flow channel having a wall-flow channel providing the diesel particulate filter and having a flow-through channel providing the downstream $NO_x$ adsorber, and enhancing the noted chances by axially aligning the flow-through channel and the wall-flow channel along the noted axial flow path. The system concomitantly provides both the noted sufficiently close proximity and the noted axial alignment by axially overlapping sections of the wall-flow channel and the flow-through channel. The system further provides an exhaust emission control regeneration method for diesel engine exhaust, including regenerating a diesel particulate filter having trapped diesel exhaust particulate, including soot, by combusting the trapped particulate and producing a combustion product from the combustion of the trapped particulate, and using the combustion product to regenerate a catalyst downstream of the diesel particulate filter, wherein the combustion product is CO, and the catalyst an $NO_x$ adsorber downstream of the diesel particulate filter, and regenerating the downstream $NO_x$ adsorber with the CO, the downstream $NO_x$ adsorber being in sufficiently close proximity to the diesel particulate filter to carry out a thermodynamically favorable reaction with the CO. The system further provides an exhaust emission control method for a diesel engine exhaust system having a diesel particulate filter trapping diesel particulate, including soot, and an $NO_x$ storage element downstream of the diesel particulate filter and storing $NO_x$, the method including regenerating the diesel particulate filter by combusting the soot to produce CO, and reacting the CO with the stored $NO_x$ to release the latter. The system further provides an exhaust emission control method for a diesel engine exhaust system having a diesel particulate filter trapping diesel particulate, including soot, and an $NO_x$ adsorber downstream of the diesel particulate filter, the method including regenerating the diesel particulate filter by combusting the soot to produce CO, oxidizing the CO to generate heat, and using the heat to assist regeneration of the downstream $NO_x$ adsorber, and further including oxidizing the CO with a catalyst, wherein the catalyst is a precious metal catalyst. The present emission control system for diesel engine exhaust includes a diesel particulate filter passing the exhaust therethrough from an upstream end to a downstream end and trapping diesel exhaust particulate, including soot, wherein at least one of the ends is coated with a catalyst facilitating heat generation and soot combustion to regenerate the diesel particulate filter, the catalyst being selected to facilitate oxidation and combustion of the soot, wherein the catalyst is preferably a precious metal catalyst, and further preferably wherein each of the upstream and downstream ends is coated with a catalyst facilitating heat generation and soot combustion to regenerate the diesel particulate filter at each of the ends, for example each of the axial ends of the filter roll in FIGS. 7–9 where the plugs are located and where most of the soot tends to accumulate.

In another embodiment, an improved filter is provided for filtering fluid, including a gas containing particulate to be filtered, such as internal combustion engine exhaust, including diesel exhaust, whether or not the device is catalytically treated to additionally provide a catalytic reaction or reduction.

It is recognized that various equivalents, alternatives and modifications are possible within the scope of the appended claims.

What is claimed is:

1. An exhaust aftertreatment combined filter and catalytic converter comprising a plurality of flow channels each having both: a) a flow-through channel catalytically reacting with exhaust; and b) a wall-flow channel trapping particulate, wherein said exhaust aftertreatment combined filter and catalytic converter comprises a plurality of sheets, at least one of which comprises a filter media sheet, said sheets defining said plurality of flow channels, including flow-through channels catalytically reacting with said exhaust and including wall-flow channels in the same said flow channels as said flow-through channels and passing exhaust through said filter media sheet and trapping particulate thereat, wherein exhaust flows axially through said exhaust aftertreatment combined filter and catalytic converter, and wherein said flow-through channels and said wall-flow channels have axially overlapped channel sections in said flow channels, and wherein exhaust flows axially through said exhaust aftertreatment combined filter and catalytic converter from an upstream end to a downstream end, said filter media sheet has a first face facing upstream and has a second face facing downstream, each said flow-through channel has a portion extending downstream from said second face of said filter media sheet, and wherein said exhaust aftertreatment combined filter and catalytic converter comprises first, second and third serially sequential surfaces in each said flow channel, wherein said exhaust flows firstly along and through said first sequential surface, then secondly along and through said second sequential surface, then thirdly along said third sequential surface, wherein said first face of said filter media sheet is said first sequential surface, said second face of said filter media sheet is said second sequential surface, and said overlapped section of said flow-through channel is said third sequential surface, wherein said flow-through channel is a channel through which exhaust flows and exits without passing through a barrier or wall which traps particulate, said wall-flow channel is a channel through which exhaust flows and exits by crossing a barrier or wall which traps particulate, and wherein said wall-flow channel is in an inserted position in said flow-through channel, wherein exhaust flows axially along an axial flow direction along an axis, and wherein said sheets comprise first, second and third sheets, said second sheet being pleated and forming with said first sheet a plurality of axially extending flow channels, said second sheet having a plurality of pleats defined by wall segments extending in alternating manner between pleat tips at axially extending bend lines, the pleat tips on one side of said second sheet being contiguous relation with said first sheet, said third sheet having a plurality of pleats defined by wall segments extending in zig-zag manner between pleat tips at transversely extending bend lines which extend transversely to said axis and transversely to said first sheet, said first sheet extending axially and extending laterally relative to said transversely extending bend lines of said pleat tips of said third sheet.

2. The exhaust aftertreatment combined filter and catalytic converter according to claim 1 wherein said axis and said transverse extension of said pleat tips of said third sheet and said lateral extension of said first sheet are all orthogonal relative to each other.

3. An exhaust aftertreatment combined filter and catalytic converter comprising a plurality of flow channels each having both: a) a flow-through channel catalytically reacting with exhaust; and b) a wall-flow channel trapping particulate wherein said exhaust aftertreatment combined filter and catalytic converter comprises a plurality of sheets, at least one of which comprises a filter media sheet, said sheets defining said plurality of flow channels, including flow-through channels catalytically reacting with said exhaust and including wall-flow channels in the same said flow channels as said flow-through channels and passing exhaust through said filter media sheet and trapping particulate thereat, wherein exhaust flows axially through said exhaust aftertreatment combined filter and catalytic converter, and wherein said flow-through channels and said wall-flow channels have axially overlapped channel sections in said flow channels, and wherein exhaust flows axially through said exhaust aftertreatment combined filter and catalytic converter from an upstream end to a downstream end, said filter media sheet has a first face facing upstream and has a second face facing downstream, each said flow-through channel has a portion extending upstream from said first face of said filter media sheet, and wherein said exhaust aftertreatment combined filter and catalytic converter comprises first, second and third serially sequential surfaces in each said flow channel, wherein said exhaust flows firstly along said first sequential surface, then secondly along and through said second sequential surface, then thirdly along and through said third sequential surface, wherein said portion of said flow-through channel is said first sequential surface, said first face of said filter media sheet is said second sequential surface, and said second face of said filter media sheet is said third sequential surface, wherein said flow-through channel is a channel through which exhaust flows and exits without passing through a barrier or wall which traps particulate, said wall-flow channel is a channel through which exhaust flows and exits by crossing a barrier or wall which traps particulate, and wherein said wall-flow channel is in an inserted position in said flow-through channel, wherein exhaust flows axially along an axial flow direction along an axis, and wherein said sheets comprise first, second and third sheets, said second sheet being pleated and forming with said first sheet a plurality of axially extending flow channels, said second sheet having a plurality of pleats defined by wall segments extending in alternating manner between pleat tips at axially extending bend lines, the pleat tips on one side of said second sheet being contiguous relation with said first sheet, said third sheet having a plurality of pleats defined by wall segments extending in zig-zag manner between pleat tips at transversely extending bend lines which extend transversely to said axis and transversely to said first sheet, said first sheet extending axially and extending laterally relative to said transversely extending bend lines of said pleat tips of said third sheet.

4. The exhaust aftertreatment combined filter and catalytic converter according to claim 3 wherein said axis and said transverse extension of said pleat tips of said third sheet and said lateral extension of said first sheet are all orthogonal relative to each other.

* * * * *

UNITED STATES PATENT AND TRADEMARK OFFICE
CERTIFICATE OF CORRECTION

PATENT NO. : 7,211,226 B2 Page 1 of 1
APPLICATION NO. : 10/075035
DATED : May 1, 2007
INVENTOR(S) : Z. Gerald Zui et al.

It is certified that error appears in the above-identified patent and that said Letters Patent is hereby corrected as shown below:

Title page, Item (73) Assignee

Delete "Fleetgaurd, Inc." and substitute therefor --Fleetguard, Inc.--

Signed and Sealed this

Twenty-sixth Day of June, 2007

JON W. DUDAS
*Director of the United States Patent and Trademark Office*